US012579635B2

(12) United States Patent

Hirano et al.

(10) Patent No.: US 12,579,635 B2
(45) Date of Patent: Mar. 17, 2026

(54) PATTERN INSPECTION APPARATUS AND PATTERN INSPECTION METHOD INSPECTING A PATTERN USING AN IMAGE CORRECTED USING OFFSET AMOUNT BASED UPON DARK NOISE LEVELS

(71) Applicant: NuFlare Technology, Inc., Yokohama (JP)

(72) Inventors: Ryoichi Hirano, Setagaya-ku (JP);
Yasuhiro Yamashita, Yokohama (JP);
Hiromu Inoue, Yokohama (JP)

(73) Assignee: NuFlare Technology, Inc., Yokohama (JP)

( * ) Notice: Subject to any disclaimer, the term of this patent is extended or adjusted under 35 U.S.C. 154(b) by 713 days.

(21) Appl. No.: 17/805,759

(22) Filed: Jun. 7, 2022

(65) Prior Publication Data

US 2023/0018318 A1      Jan. 19, 2023

(30) Foreign Application Priority Data

Jul. 19, 2021     (JP) ................................. 2021-118583

(51) Int. Cl.
| | |
|---|---|
| *G06T 7/00* | (2017.01) |
| *G01N 21/88* | (2006.01) |
| *G01N 21/956* | (2006.01) |

(52) U.S. Cl.
CPC ......... *G06T 7/001* (2013.01); *G01N 21/8806* (2013.01); *G01N 21/95607* (2013.01);
(Continued)

(58) Field of Classification Search
CPC .......... G06T 7/001; G06T 2207/30148; G01N 21/8806; G01N 21/95607; G01N 2021/8822; G01N 2021/95676; G03F 1/84
See application file for complete search history.

(56) References Cited

U.S. PATENT DOCUMENTS 6,351,519 B1 *   2/2002   Bonk ..................... A61B 6/585
                                                       378/207
2003/0025065 A1      2/2003   Hashimoto
(Continued)

FOREIGN PATENT DOCUMENTS

JP            3-235586 A      10/1991
JP       2000-162505 A       6/2000
(Continued)

OTHER PUBLICATIONS

Hirano, R. et al. "A novel defect detection optical system using 199nm light source for EUVL mask" Proc. of SPIE vol. 7638, 76382Z-2, 2010 (10 pages).
(Continued)

*Primary Examiner* — Jennifer D Bennett
(74) *Attorney, Agent, or Firm* — Oblon, McClelland, Maier & Neustadt, L.L.P.

(57)      ABSTRACT

A pattern inspection apparatus includes an illumination optical system to illuminate an inspection substrate on which a pattern is formed, an offset calculation circuit to calculate an offset amount which depends on an image accumulation time of each of a plurality of photo sensor elements arrayed two-dimensionally, a time delay integration (TDI) sensor to include the plurality of photo sensor elements, to acquire an image of the inspection substrate by receiving a transmitted light or a reflected light from the inspection substrate by the plurality of photo sensor elements, to correct, using the offset amount, a pixel value of optical image data of an acquired image, and to output the optical image data having been corrected, and a comparison circuit to compare an optical image formed by the optical image data output from the TDI sensor with a reference image.

3 Claims, 15 Drawing Sheets

(52) U.S. Cl.
CPC ............... *G01N 2021/8822* (2013.01); *G06T 2207/30148* (2013.01)

(56)                References Cited

U.S. PATENT DOCUMENTS

| | | | | | |
|---|---|---|---|---|---|
| 2008/0198368 | A1* | 8/2008 | Matsumoto | ........ | G01N 21/6452 |
| | | | | | 356/73 |
| 2009/0040513 | A1* | 2/2009 | Abe | ................. | G01N 21/95607 |
| | | | | | 356/237.5 |
| 2021/0251586 | A1* | 8/2021 | Oda | .................... | A61B 6/4233 |
| 2021/0385396 | A1* | 12/2021 | Kim | ........................ | H04N 25/73 |

FOREIGN PATENT DOCUMENTS

| | | | |
|---|---|---|---|
| JP | 2001-94882 | A | 4/2001 |
| JP | 2003-32435 | A | 1/2003 |
| JP | 2003-298952 | A | 10/2003 |
| JP | 2006-275780 | A | 10/2006 |
| JP | 2008-177917 | A | 7/2008 |
| JP | 2013-38497 | A | 2/2013 |

OTHER PUBLICATIONS

Japanese Office Action issued Feb. 18, 2025 in Japanese Patent Application No. 2021-118583 (with unedited computer-generated English Translation), 8 pages.
Japanese Office Action issued May 27, 2025, in corresponding Japanese Patent Application No. 2021-118583 (with English Translation), 6 pages.

* cited by examiner

PATTERN INSPECTION APPARATUS AND PATTERN INSPECTION METHOD INSPECTING A PATTERN USING AN IMAGE CORRECTED USING OFFSET AMOUNT BASED UPON DARK NOISE LEVELS

CROSS-REFERENCE TO RELATED APPLICATION

This application is based upon and claims the benefit of priority from prior Japanese Patent Application No. 2021-118583 filed on Jul. 19, 2021 in Japan, the entire contents of which are incorporated herein by reference.

BACKGROUND OF THE INVENTION

Field of the Invention

Embodiments of the present invention relate to a pattern inspection apparatus and a pattern inspection method. For example, they relate to an apparatus and method for inspecting a defect of a pattern on an exposure mask used in semiconductor manufacturing.

Description of Related Art

With recent progress in high integration and large capacity of the LSI (Large Scale Integrated circuits), the line width (critical dimension) required for circuits of semiconductor elements is becoming increasingly narrower. Such semiconductor elements are manufactured through circuit-forming by exposing and transferring a pattern onto a wafer by means of a reduced projection exposure apparatus known as a stepper, using an original or "master" pattern (also called a mask or a reticle, hereinafter generically referred to as a mask) on which a circuit pattern has been formed.

Since LSI manufacturing requires an enormous production cost, it is essential to improve the yield. One of major factors that decrease the yield of the LSI manufacturing is due to pattern defects on a mask for exposing/transferring an ultrafine pattern onto a semiconductor wafer by the photolithography technology. In recent years, with miniaturization of dimensions of LSI patterns formed on a semiconductor wafer, dimensions to be detected as a pattern defect have become extremely small. Therefore, the pattern inspection apparatus for inspecting defects of a transfer mask used in manufacturing LSI needs to be highly accurate.

As an inspection method, for example, there is "die-to-die inspection" or "die-to-database inspection". The "die-to-die inspection" method compares data of optical images of identical patterns at different positions on the same mask. The "die-to-database inspection" method inputs, into an inspection apparatus, writing data (design data) generated by converting pattern-designed CAD data to a writing apparatus specific format to be input to the writing apparatus when a pattern is written on the mask, generates a reference image based on the input writing data, and compares the generated reference image with an optical image being measured target data obtained by imaging the pattern.

With miniaturization of patterns, a technique is adopted which increases a transfer resolution by adjusting the transmittance or reflectance of the material of an exposure mask. On the other hand, in the inspection apparatus, if the transmittance or reflectance of a mask used as a target object decreases, images having sufficient information cannot be obtained. Since there is a limit to the increase in the light amount from the light source, it is examined to cope with this limit problem by increasing the image accumulation time of each photo sensor element of the imaging sensor. However, if a sensor is operated using different image accumulation time, the sensor temperature changes, which changes the dark noise level. As a result, a problem occurs that the accuracy of images obtained is degraded, and therefore, a pseudo defect is generated.

Although not relating to a pattern inspection apparatus for a mask and the like, there is disclosed to shorten the accumulation time of a sensor of an image recognition apparatus, which recognizes a photographic subject such as a finger and a bar code, when the ambient temperature is high (e.g., refer to Japanese Patent Application Laid-open (JP-A) No. 2003-032435).

BRIEF SUMMARY OF THE INVENTION

According to one aspect of the present invention, a pattern inspection apparatus includes
- an illumination optical system configured to illuminate an inspection substrate on which a pattern is formed;
- an offset calculation circuit configured to calculate an offset amount which depends on an image accumulation time of each of a plurality of photo sensor elements arrayed two-dimensionally;
- a time delay integration (TDI) sensor configured to include the plurality of photo sensor elements, to acquire an image of the inspection substrate by receiving one of a transmitted light and a reflected light from the inspection substrate by the plurality of photo sensor elements, to correct, using the offset amount, a pixel value of optical image data of an acquired image, and to output the optical image data having been corrected; and
- a comparison circuit configured to compare an optical image formed by the optical image data output from the TDI sensor with a reference image.

According to another aspect of the present invention, a pattern inspection apparatus includes
- an illumination optical system configured to illuminate an inspection substrate on which a pattern is formed;
- a temperature change amount calculation circuit configured to calculate a temperature change amount which depends on an image accumulation time of each of a plurality of photo sensor elements arrayed two-dimensionally;
- a time delay integration (TDI) sensor configured to include the plurality of photo sensor elements and to acquire an image of the inspection substrate by receiving one of a transmitted light and a reflected light from the inspection substrate by the plurality of photo sensor elements while controlling a temperature of the plurality of photo sensor elements by using the temperature change amount; and
- a comparison circuit configured to compare an acquired optical image with a reference image.

According to yet another aspect of the present invention, a pattern inspection method includes
- illuminating an inspection substrate on which a pattern is formed;
- calculating an offset amount which depends on an image accumulation time of each of a plurality of photo sensor elements arrayed two-dimensionally;
- acquiring, using a time delay integration (TDI) sensor which includes the plurality of photo sensor elements, an image of the inspection substrate by receiving one of a transmitted light and a reflected light from the inspection substrate by the plurality of photo sensor elements,
correcting, using the offset amount, a pixel value of
optical image data of an acquired image, and outputting
the optical image data having been corrected; and
comparing an optical image formed by the optical image
data output from the TDI sensor with a reference
image.

According to yet another aspect of the present invention,
a pattern inspection method includes
illuminating an inspection substrate on which a pattern is
formed;
calculating a temperature change amount which depends
on an image accumulation time of each of a plurality of
photo sensor elements arrayed two-dimensionally;
acquiring, using a time delay integration (TDI) sensor
which includes the plurality of photo sensor elements,
an image of the inspection substrate by receiving one of
a transmitted light and a reflected light from the inspec-
tion substrate by the plurality of photo sensor elements
while controlling a temperature of the plurality of photo
sensor elements by using the temperature change
amount; and
comparing an acquired optical image with a reference
image.

DETAILED DESCRIPTION OF THE INVENTION

Hereinafter, embodiments of the present invention
describe an inspection apparatus and method capable of
inhibiting/preventing degradation of the accuracy of images
resulting from a change of image accumulation time.

First Embodiment

Figure 1:
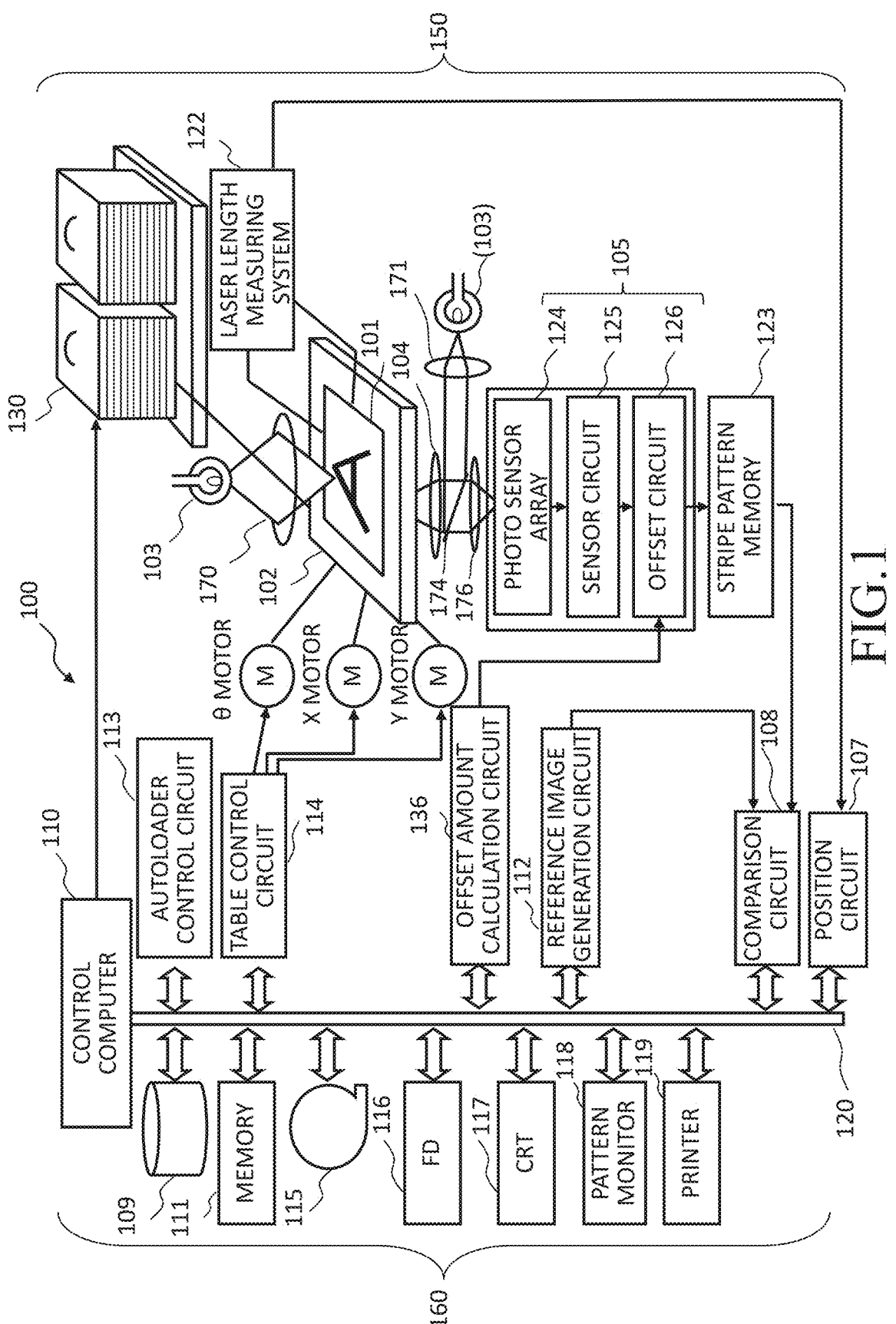
FIG. 1 is a configuration diagram showing a pattern
inspection apparatus according to a first embodiment.

FIG. 1 is a configuration diagram showing a pattern
inspection apparatus according to a first embodiment. As
shown in FIG. 1, an inspection apparatus 100 that inspects
defects of a pattern formed on an inspection target substrate,
such as a mask, includes an optical image acquisition
mechanism 150 and a control system circuit 160.

The optical image acquisition mechanism 150 includes a
light source 103, a transmission illumination optical system
170, a reflection illumination optical system 171, an XYθ
table 102 movably arranged, a magnifying optical system
104, a beam splitter 174, an image forming optical system
176, a TDI (time delay integration) sensor 105, a stripe
pattern memory 123, a laser length measuring system 122,
and an autoloader 130. When conducting a transmission
inspection using a transmitted light, the reflection illumina-
tion optical system 171, and the beam splitter 174 may be
omitted. When conducting a reflection inspection using a
reflected light, the transmission illumination optical system
170 may be omitted.

On the XYθ table 102, there is placed a substrate 101
conveyed from the autoloader 130. The substrate 101 is, for
example, an exposure photomask used for transfer printing
a pattern onto a semiconductor substrate such as a wafer. A
plurality of figure patterns to be inspected are formed on the
photomask. The substrate 101 is disposed, for example, with
its pattern-forming surface facing downward, on the XYθ
table 102.

The TDI sensor 105 includes a photo sensor array 124, a
sensor circuit 125, and an offset circuit 126. The photo
sensor array 124 includes a plurality of photo sensor ele-
ments arrayed two-dimensionally. When each photo sensor
element acquires an image, a predetermined image accumu-
lation time is set. Outputs of a plurality of photo sensor
elements arrayed in a scanning direction are integrated, and
output from the TDI sensor 105. The plurality of photo
sensor elements arrayed in a scanning direction acquire
images of the same pixel while shifting the time according
to the movement of the XYθ table 102.

In the control system circuit 160, a control computer 110
which controls the whole of the inspection apparatus 100 is
connected, through a bus 120, to a position circuit 107, a
comparison circuit 108, a reference image generation circuit
112, an autoloader control circuit 113, a table control circuit
114, an offset amount calculation circuit 136, a magnetic
disk drive 109, a memory 111, a magnetic tape drive 115, a
flexible disk drive (FD) 116, a CRT 117, a pattern monitor
118, and a printer 119. The TDI sensor 105 is connected to
the stripe pattern memory 123 which is connected to the
comparison circuit 108. The XYθ table 102 is driven by the
x, y, and θ-axis motors, and serves as an example of the
stage. The reference image generation circuit 112 is con-
nected to the comparison circuit 108. The offset amount
calculation circuit 136 is connected to the offset circuit 126.

Each " . . . circuit", such as the position circuit 107, the comparison circuit 108, the reference image generation circuit 112, the autoloader control circuit 113, the table control circuit 114, and the offset amount calculation circuit 136 includes processing circuitry. The processing circuitry includes, for example, an electric circuit, a computer, a processor, a circuit board, a quantum circuit, a semiconductor device, or the like. Further, common processing circuitry (the same processing circuitry), or different processing circuitry (separate processing circuitry) may be used for each "circuit". For example, each " . . . circuit", such as the position circuit 107, the comparison circuit 108, the reference image generation circuit 112, the autoloader control circuit 113, the table control circuit 114, and the offset amount calculation circuit 136 may be configured and implemented by the control computer 110. Input data necessary for the position circuit 107, the comparison circuit 108, the reference image generation circuit 112, the autoloader control circuit 113, the table control circuit 114, and the offset amount calculation circuit 136, and operated (calculated) results are stored in a memory (not shown) in each circuit, or in the memory 111 each time. Input data necessary for the control computer 110 and operated (calculated) results are stored in a memory (not shown) in the control computer 110, or the memory 111 each time. A program for causing a computer or a processor to execute processing or the like may be stored in a recording medium, such as the magnetic disk drive 109, the magnetic tape drive 115, the FD 116, the ROM (Read Only Memory), or the like.

In the inspection apparatus 100, a transmission inspection optical system of high magnification is configured by the light source 103, the XYθ table 102, the transmission illumination optical system 170, the magnifying optical system 104, the image forming optical system 176, and the TDI sensor 105. A reflection inspection optical system of high magnification is configured by the light source 103, the reflection illumination optical system 171, the beam splitter 174, the magnifying optical system 104, the XYθ table 102, the image forming optical system 176, and the TDI sensor 105.

The XYθ table 102 is driven by the table control circuit 114 under the control of the control computer 110. The XYθ table 102 can be moved by a drive system such as a three-axis (X, Y, and θ) motor which drives the table in the directions of x, y, and θ. For example, a step motor can be used as each of these X, Y, and θ motors. The XYθ table 102 is movable in the horizontal direction and the rotation direction by the X-, Y-, and θ-axis motors. The movement position of the substrate 101 placed on the XYθ table 102 is measured by the laser length measuring system 122, and supplied to the position circuit 107. The transfer (feed) processing of the substrate 101 from the autoloader 130 to the XYθ table 102, and from the XYθ table 102 to the autoloader 130 is controlled by the autoloader control circuit 113.

Writing data (design data) used as a basis for forming patterns on the inspection substrate 101 which is to be inspected is input from the outside of the inspection apparatus 100, and stored in the magnetic disk drive 109. The writing data defines a plurality of figure patterns, and each figure pattern is usually configured by combining a plurality of element figures. Such a figure pattern may be configured by one figure. Then, each pattern corresponding to and based on each figure pattern defined by the writing data is formed on the inspection substrate 101 to be inspected.

FIG. 1 shows configuration elements necessary for describing the first embodiment. It should be understood that other configuration elements generally necessary for the inspection apparatus 100 may also be included therein.

Figure 2:
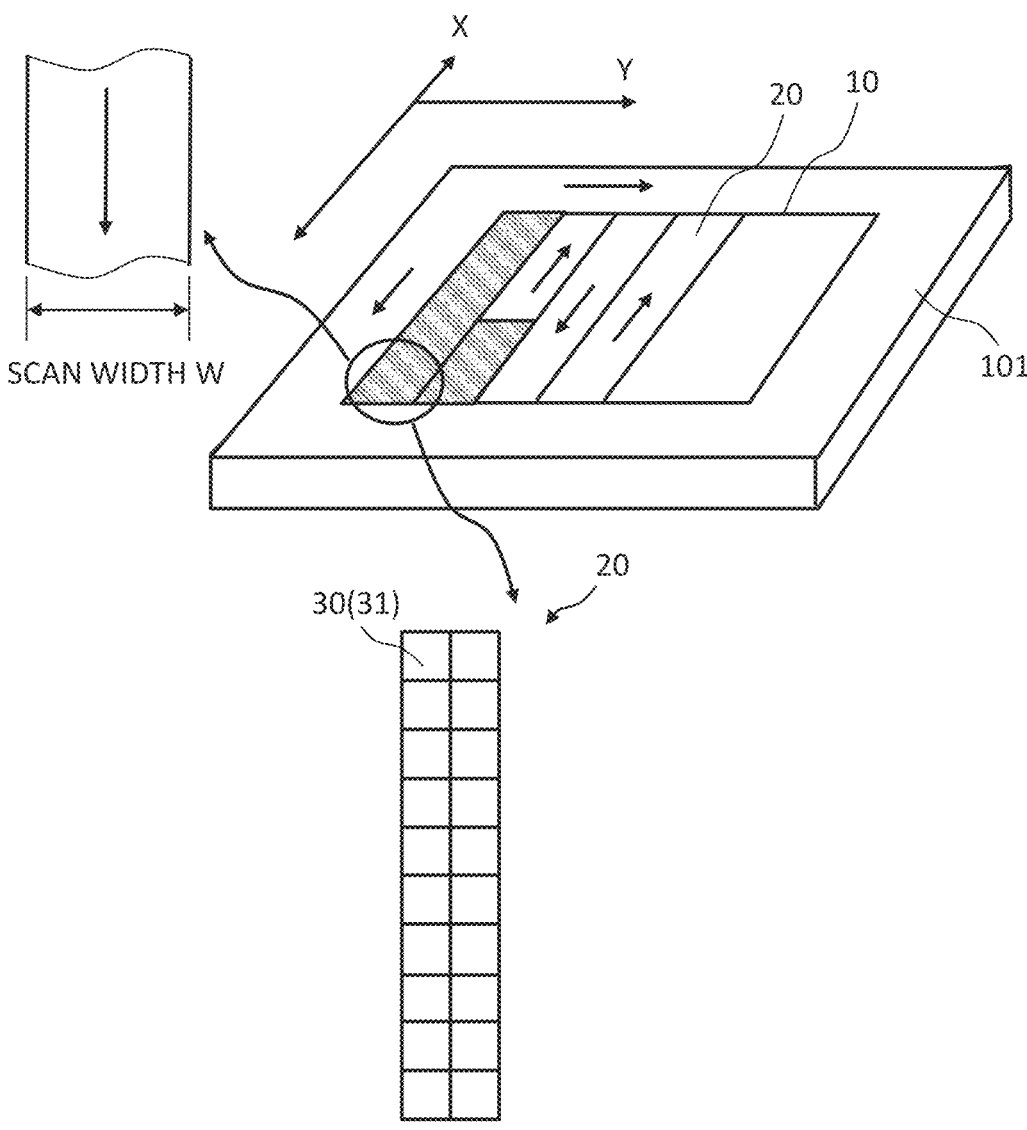
FIG. 2 is a conceptual diagram illustrating an inspection
region according to the first embodiment.

FIG. 2 is a conceptual diagram illustrating an inspection region according to the first embodiment. As shown in FIG. 2, an inspection region 10 (the entire inspection region) of the substrate 101 is virtually divided into a plurality of strip-shaped inspection stripes 20 each having a width W in the y direction, for example, where the width W is a scan width of the TDI sensor 105. The inspection apparatus 100 acquires an image (stripe region image) for each inspection stripe 20. Specifically, with respect to each of the inspection stripes 20, the inspection apparatus 100 captures (acquires) an image of a figure pattern arranged in the stripe region concerned, with a laser light (inspection light), imaging in the longitudinal direction (the x direction) of the stripe region concerned. In order to prevent a missing image, it is preferable that a plurality of inspection stripes 20 are set such that adjacent inspection stripes 20 overlap with each other by a predetermined margin width.

The TDI sensor 105 that continuously moves relatively in the x direction by the movement of the XYθ table 120 acquires optical images. The TDI sensor 105 continuously captures optical images each having a scan width W as shown in FIG. 2. In other words, the TDI sensor 105 acquires optical images of a plurality of figure patterns formed on the substrate 101 while moving relatively in the integrated direction of the TDI sensor 105. According to the first embodiment, after capturing (acquiring) an optical image in one inspection stripe 20, the TDI sensor 105 moves in the y direction to the position of the next inspection stripe 20, and similarly captures another optical image having the scan width W continuously while moving in the direction reverse to the last image capturing direction. Thereby, the image capturing is repeated in the forward (FWD) and backward (BWD) directions, namely changing the direction reversely when advancing and returning.

In an actual inspection, as shown in FIG. 2, the stripe region image of each inspection stripe 20 is divided into images of a plurality of rectangular (including square) frame regions 30. Then, inspection is performed for each image of the frame region 30. For example, it is divided into the size of 512×512 pixels. Therefore, a reference image to be compared with a frame image 31 of the frame region 30 is similarly generated for each frame region 30.

The direction of the image capturing is not limited to repeating the forward (FWD) and backward (BWD) movement. Images may be captured in a fixed one direction. For example, FWD and FWD may be repeated, or alternatively, BWD and BWD may be repeated.

As described above, with miniaturization of patterns, a technique is adopted which increases a transfer resolution by adjusting the transmittance or reflectance of the material of an exposure mask. It is desirable to perform inspection using the same inspection apparatus 100 even with respect to a plurality of substrates 101 having different transmittance or reflectance. On the other hand, in the inspection apparatus, if the transmittance or reflectance of a mask used as the substrate 101 decreases, the received light amount of the TDI sensor 105 falls. As a result, images having sufficient information cannot be obtained. There is a limit to the increase in the light amount from the light source 103, and then, this can be coped with by increasing the image accumulation time of each photo sensor element of the TDI sensor 105 used for imaging. For example, by doubling image accumulation time instead of doubling the light amount, it is possible to acquire an image equivalent to the image obtained by the doubled light amount.

However, when operating, using different image accumulation time t, each photo sensor element, the sensor temperature T changes, and the dark noise level Dr changes. The dark noise level Dr is dependent on the sensor temperature.

Figure 3:
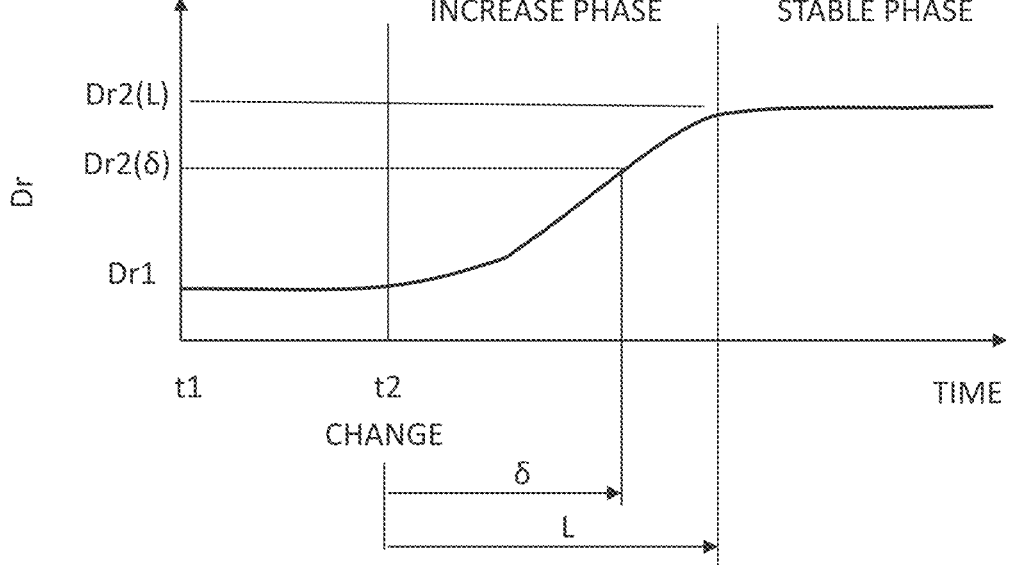
FIG. 3 is a graph showing an example of change of a dark
noise level along with changing of an image accumulation
time of each photo sensor element of the TDI sensor
according to the first embodiment.

FIG. 3 is a graph showing an example of change of a dark noise level along with changing of an image accumulation time of each photo sensor element of the TDI sensor according to the first embodiment. When the TDI sensor 105 is driven under certain operating conditions for a sufficiently long time L, while employing an image accumulation time t1 of the photo sensor element, from the state of an initial temperature T0, the sensor temperature T becomes T1 based on the operating environment and consumed power of the photo sensor element. The sensor temperature T can be defined by the following equation (1).

$$T = f1(t1, L, T0) = T1 \tag{1}$$

The dark noise level Dr in the state described above is defined by the following equation (2).

$$Dr = f2(T1) = Dr1 \tag{2}$$

With respect to the TDI sensor 105 which has been driven employing the image accumulation time t1 of the photo sensor element, the image accumulation time t is changed from t1 to t2. In that case, according to an elapsed time δ since the time of changing, the sensor temperature T changes based on the operating environment and consumed power of the photo sensor element. The sensor temperature T in that case can be defined by following equation (3).

$$T = f1(t2, \delta, T1) = T2 \tag{3}$$

The dark noise level Dr in that state can be defined by the following equation (4).

$$Dr = f2(T2) = Dr2 \tag{4}$$

If the elapsed time δ becomes the sufficiently long time L, the sensor temperature T2 changes as shown in the following equation (5).

$$T2 = f1(t2, L, T1) \tag{5}$$

Therefore, as shown in FIG. 3, during the period (increase phase) from the time when the image accumulation time is changed to t2 to the time when the elapsed time δ reaches L, the dark noise level Dr2 changes according to the elapsed time δ. Specifically, the dark noise level Dr2 increases. As the period of the increase phase, several tens of minutes is estimated. For example, about ten to thirty minutes is estimated. After the elapsed time δ has reached L (stable phase), the dark noise level Dr2 becomes a constant value Dr2(L).

Figure 4:
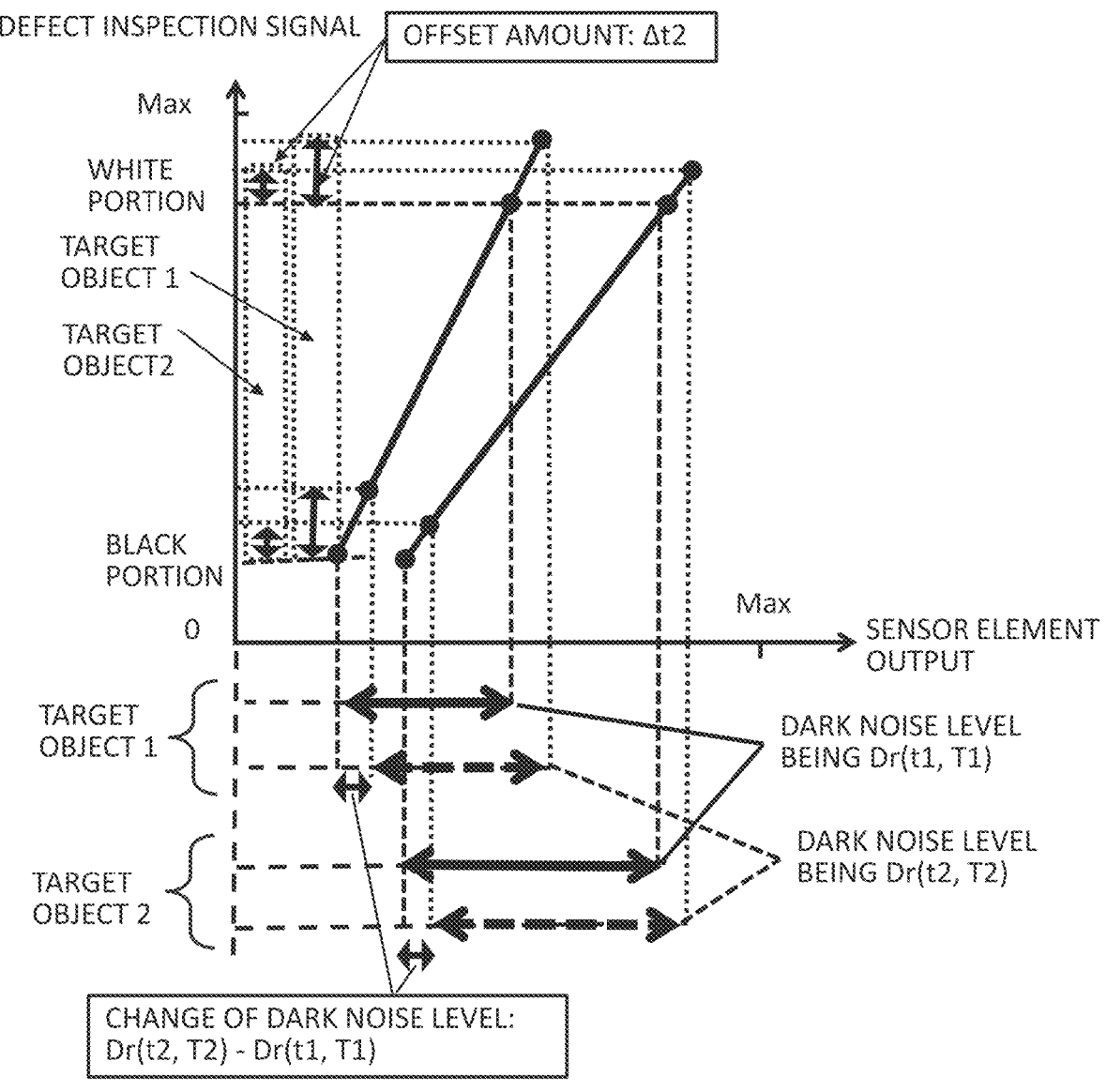
FIG. 4 is a graph showing an example of a correlation
between an inspection signal and a sensor output, along with
a change of a dark noise level according to the first embodi-
ment.

FIG. 4 is a graph showing an example of a correlation between an inspection signal and a sensor output, along with a change of a dark noise level according to the first embodiment. In FIG. 4, the ordinate axis indicates an inspection signal (pixel value), and the abscissa axis indicates an output (voltage) of the TDI sensor 105. The inspection light irradiates an inspection target object, and the amount of light incident on the TDI sensor 105 (example of camera) varies depending on the material of the target object. In FIG. 4, with respect to a light-shielded portion (black portion) where a light shielding film is formed, the photo sensor element output showing the light-shielded portion (black portion) of the target object 1 is smaller than the photo sensor element output showing the light-shielded portion (black portion) of the target object 2, wherein the photo sensor element output indicates integrated outputs of a plurality of elements arrayed in a scanning direction. Further, with respect to a glass substrate portion (transmission portion, white portion)

where no light shielding film is formed, the photo sensor element output showing the transmission portion (white portion) of the target object 1 is smaller than the photo sensor element output showing the transmission portion (white portion) of the target object 2. Thus, the minimum and the maximum of the output of the photo sensor element vary depending on the material of the target object. On the other hand, in a defect inspection, a measured image to be inspected is compared with a reference image based on design data or a die image acquired at a different position on the target object. Therefore, it is necessary to standardize outputs of the photo sensor element according to a fixed standard. Specifically, as shown in FIG. 4, the output of the photo sensor element is corrected (calibrated) by a linear interpolation by the sensor circuit 125 so that the inspection signal (pixel value) at the light-shielded portion (black portion) may be the same value regardless of the material of the target object. Similarly, the output of the photo sensor element is corrected (calibrated) by a linear interpolation by the sensor circuit 125 so that the inspection signal (pixel value) at the transmission portion (white portion) may be the same value regardless of the material of the target object. Therefore, as the output of the TDI sensor 105, a pixel value after correction is output as an inspection signal.

Although the case of a transmission inspection in which the TDI sensor 105 receives a transmitted light being an inspection light having transmitted through the substrate 101 has been described above, it is not limited thereto. A reflection inspection in which an inspection light irradiates the substrate 101 and the TDI sensor 105 receives a reflected light from the substrate 101 may also be performed. In the case of a reflection inspection, the light-shielded portion (light shielding film) of the target object is a white portion, and the transmission portion (glass substrate) is a black portion.

By performing calibration, as shown in FIG. 4, a linear proportional correlation can be, for example, obtained between an inspection signal and a photo sensor element output (after integration), for each target object. As shown in FIG. 4, the gradient and the intercept are various for each target object.

If the dark noise level Dr changes, the photo sensor element output (after integration) of each pixel used as an imaging position changes by the change amount $\Delta Dr(=Dr2-Dr1)$ of the dark noise level Dr. In the case of FIG. 4, the photo sensor element output increases. As a result, an inspection signal also changes. Since, in FIG. 4, the inspection signal increases, an image is generated in which a pixel value to be used for inspection has an error. Thus, there is a problem that the accuracy of images obtained is degraded, and therefore, a pseudo defect is generated.

Then, according to the first embodiment, the change amount of an inspection signal corresponding to the change amount $\Delta Dr(=Dr2-Dr1)$ of the dark noise level Dr is obtained as an offset amount Δt, and the inspection signal is corrected.

Figure 5:
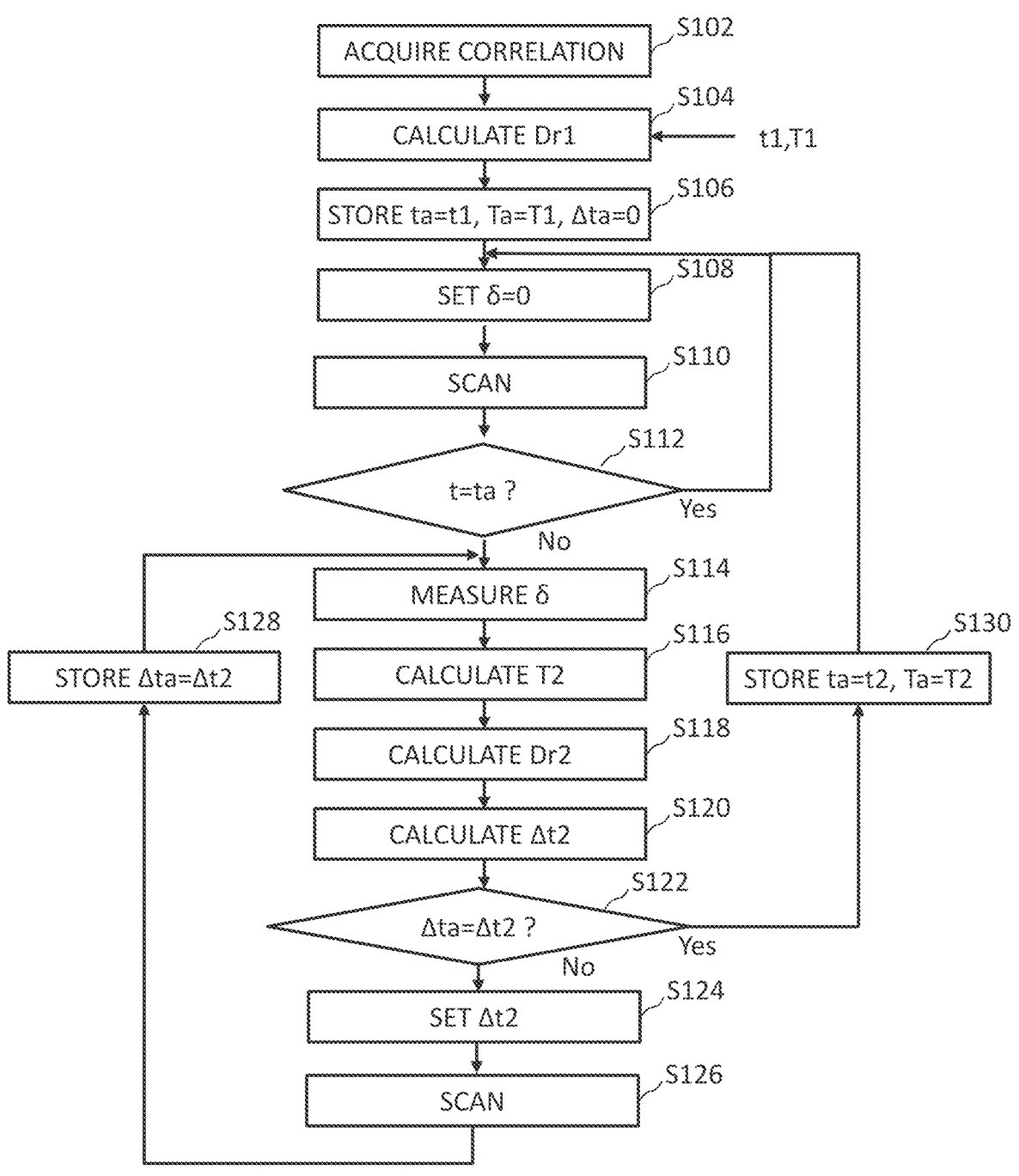
FIG. 5 is a flowchart showing an example of main steps
of an image acquisition method according to the first
embodiment.

FIG. 5 is a flowchart showing an example of main steps of an image acquisition method according to the first embodiment. In FIG. 5, the image acquisition method of the first embodiment executes a series of steps: a correlation acquisition step (S102), a Dr1 calculation step (S104), a parameter storage (recording) step (S106), a setting step (S108), a scanning step (S110), a determination step (S112), 6 measuring step (S114), a T2 calculation step (S116), a Dr2 calculation step (S118), a Δt2 calculation step (S120), a determination step (S122), a $\Delta t2$ setting step (S124), a scanning step (S126), a storage (recording) step (S128), and a storage step (S130).

In the correlation acquisition step (S102), first, a pattern on the substrate is imaged by the TDI sensor 105 having been driven for a sufficiently long time L, employing an image accumulation time t1, and the correlation is acquired between an inspection signal (pixel value) for which calibration has been performed and a photo sensor element output. In the case of changing the image accumulation time with respect to one substrate 101, calibration is performed using this substrate, and then, the correlation is acquired. In the case of using a plurality of kinds of substrates, the correlation is acquired for each substrate. Thereby, the correlation in the stable phase, using the image accumulation time t1, can be acquired.

In performing calibration, the sensor circuit 125 adjusts the dynamic range of the TDI sensor 105 to a dynamic range that makes (defines) the light amount which is larger than the incident light amount at the white portion be the maximum gray scale level, and the light amount which is smaller than the incident light amount at the black portion be zero. When using the resolution of 256 gray scale levels, for example, the gray scale level of the white portion is adjusted to be 200, for example. In the case of using a plurality of kinds of substrates, the sensor circuit 125 performs adjustment for all the substrates such that the gray scale level of the white portion and that of the black portion are the same value. Thereby, the data of the correlation in the case of the dark noise level Dr1 shown in FIG. 4 can be obtained.

Figure 6:
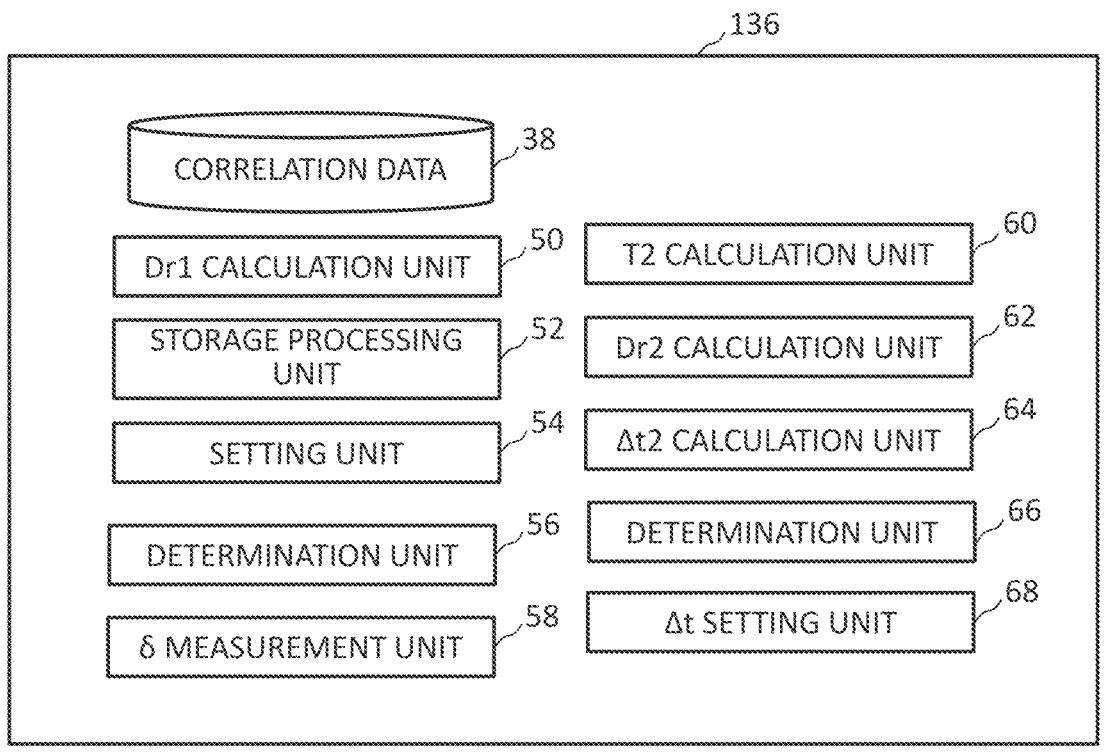
FIG. 6 is a block diagram showing an example of an
internal configuration of an offset amount calculation circuit
according to the first embodiment.

FIG. 6 is a block diagram showing an example of an internal configuration of an offset amount calculation circuit according to the first embodiment. In FIG. 6, in the offset amount calculation circuit 136, there are arranged a storage device 38 such as a magnetic disk, a Dr1 calculation unit 50, a storage (recording) processing unit 52, a setting unit 54, a determination unit 56, a $\delta$ measurement unit 58, a T2 calculation unit 60, a Dr2 calculation unit 62, a $\Delta t2$ calculation unit 64, a determination unit 66, and a $\Delta t$ setting unit 68. Each " . . . unit", such as the Dr1 calculation unit 50, the storage processing unit 52, the setting unit 54, the determination unit 56, the $\delta$ measurement unit 58, the T2 calculation unit 60, the Dr2 calculation unit 62, the $\Delta t2$ calculation unit 64, the determination unit 66, and the $\Delta t$ setting unit 68 includes processing circuitry. The processing circuitry includes, for example, an electric circuit, a computer, a processor, a circuit board, a quantum circuit, a semiconductor device, or the like. Further, common processing circuitry (the same processing circuitry), or different processing circuitry (separate processing circuitry) may be used for each " . . . unit". Input data necessary for the Dr1 calculation unit 50, the storage processing unit 52, the setting unit 54, the determination unit 56, the $\delta$ measurement unit 58, the T2 calculation unit 60, the Dr2 calculation unit 62, the $\Delta t2$ calculation unit 64, the determination unit 66, and the at setting unit 68, and operated (calculated) results are stored in a memory (not shown) in the offset amount calculation unit 136, or in the memory 111 each time.

Correlation data obtained in the correlation acquisition step (S102) is stored in the storage device 38.

In the Dr1 calculation step (S104), the Dr1 calculation unit 50 calculates a dark noise level Dr1 in the case where the TDI sensor 105 has been driven for a sufficiently long time L employing an image accumulation time t1. Specifically, first, the sensor temperature T1 in the drive state described above is obtained by the equation (1). Then, using this sensor temperature T1, the dark noise level Dr1 is calculated by the equation (2).

In the parameter storage step (S106), the storage processing unit 52 stores (records) the image accumulation time ta=t1, the sensor temperature Ta=T1, and the offset amount $\Delta ta=0$.

In the setting step (S108), the setting unit 54 sets the elapsed driving time $\delta=0$.

In the scanning step (S110), the optical image acquisition mechanism 150 acquires an optical images of the inspection substrate 101 on which a pattern is formed. First, the optical image acquisition mechanism 150 scans the inspection stripe 20 with laser beams (inspection light) so as to acquire, for each inspection stripe 20, an image of the stripe region by the TDI sensor 105. Detailed operations are as follows: The XY$\theta$ table 102 is moved to the position where a target inspection stripe 20 can be image-captured. In the transmission inspection, a pattern formed on the substrate 101 is irradiated with a laser light (e.g., DUV light) serving as an inspection light, whose wavelength is equal to or shorter than that of a light in the ultraviolet region, from the appropriate light source 103 through the illumination optical system 170. In other words, the transmission illumination optical system 170 illuminates the inspection substrate on which a pattern is formed. A light having passed through the substrate 101 is focused, through the magnifying optical system 104, to form an image on the TDI sensor 105 (example of a sensor) as an incident optical image by the image forming optical system 176. Specifically, a light having passed through the substrate 101 is focused, through the magnifying optical system 104, to form an image on the photo sensor array 124 as an incident optical image by the image forming optical system 176.

Alternatively, in the reflection inspection, the beam splitter 174 is irradiated with a laser light (e.g., DUV light) serving as an inspection light, whose wavelength is equal to or shorter than that of a light in the ultraviolet region, from the appropriate light source 103 by the reflection illumination optical system 171. The laser irradiation light is reflected from the beam splitter 174, and the target object 101 is irradiated with the laser irradiation light by the magnifying optical system 104. In other words, the illumination optical system composed of the reflection illumination optical system 171, the beam splitter 174, and the magnifying optical system 104 illuminates the inspection substrate 101 on which a pattern is formed. A light reflected from the target object 101 is focused, through the magnifying optical system 104 and the beam splitter 174, to form an image on the photodiode array sensor 105 (example of a sensor) as an incident optical image by the image forming optical system 176. Specifically, a light reflected from the substrate 101 is focused, through the magnifying optical system 104, to form an image on the photo sensor array 124 as an incident optical image by the image forming optical system 176.

A pattern image focused/formed on the photo sensor array 124 is photoelectrically converted by each photo sensor element of the photo sensor array 124, and further, analog-to-digital (A/D) converted by the sensor circuit 125. At this process, the output after integration of a plurality of photo sensor elements arrayed in the scanning direction is converted to an inspection signal (pixel value) corresponding to the correlation described above by the sensor circuit 125. Then, the inspection signal (pixel value) is offset by the set offset amount $\Delta t$ by the offset circuit 126. The offset amount $\Delta t$ is set to be an offset amount $\Delta t1=0$ being an initial value. Therefore, here, the inspection signal (pixel value) is output, without being offset, to the stripe pattern memory 123. Data of the pixel value of the inspection stripe 20 to be measured is stored in the stripe pattern memory 123. Measurement data (pixel data) is, for example, 8-bit unsigned data, and indicates a gray scale level of brightness (light amount) of each pixel.

In the determination step (S112), the determination unit 56 determines whether the image accumulation time t of the photo sensor element is the same as the stored (recorded) ta. If the image accumulation time t of the photo sensor element is the same as the stored ta, it returns to the setting step (S108). Then, each step from the setting step (S108) to the determination step (S112) is repeated until the image accumulation time t of the photo sensor element becomes different from ta currently recorded.

In the case of not changing the image accumulation time of the photo sensor element when acquiring an image of each region in the same substrate, the image of each inspection stripe 20 is acquired by the TDI sensor 105 employing the same image accumulation time t1 and the offset amount being zero. Then, it proceeds to comparison processing described later.

Depending on changing of the image accumulation time of the photo sensor element, the movement speed of the XYθ table 102 (stage) is changed. In the case of lengthening the image accumulation time of the photo sensor element, the movement speed of the XYθ table 102 is made to be slow according to the lengthening. In the case of shortening the image accumulation time of the photo sensor element, the movement speed of the XYθ table 102 is made to be fast according to the shortening.

As an example of changing the image accumulation time of a photo sensor element, there is a case where the inspection target (image acquisition target) is changed to another substrate 101. Said differently, the case of changing, per inspection processing, the image accumulation time of the photo sensor element can be the example. Alternatively, the case of changing, per day (time), the image accumulation time of the photo sensor element can be the example. Further, the case where the image accumulation time of the photo sensor element is changed between the regions such as inspection stripes 20 in the same substrate can be the example. In order to lengthen the image accumulation time of the photo sensor element, the movement speed of the XYθ table 102 (stage) is delayed (made slow) according to the lengthening of the image accumulation time. Therefore, the inspection time per substrate increases. To cope with this, inspection is performed with a high sensitivity (low stage speed: long image accumulation time) for a portion (a plurality of stripes) of the substrate 101, and is performed at a normal stage speed (high stage speed; short image accumulation time) for the substrate 101 except for the portion described above. Therefore, the increase in the inspection time can be suppressed to be minimum.

When the image accumulation time t of the photo sensor element is different from ta recorded in the offset amount calculation circuit 136, in other words, when the image accumulation time of the photo sensor element is changed to t2 from t1, it proceeds to the δ measuring step (S114).

In the δ measuring step (S114), the δ measurement unit 58 starts measuring the elapsed time δ, at the time of changing the image accumulation time of the photo sensor element to t2 from t1.

In the T2 calculation step (S116), the T2 calculation unit 60 calculates a sensor temperature T2 corresponding to the elapsed time δ since changing the image accumulation time of the photo sensor element to t2 from t1. As the sensor temperature at the time of the changing, T1 currently recorded in Ta may be used. The sensor temperature T2 can be obtained by the equation (3).

In the Dr2 calculation step (S118), the Dr2 calculation unit 62 calculates a dark noise level Dr2 in the state of the sensor temperature T2 which was changed by starting using the image accumulation time t2 of the photo sensor element. The dark noise level Dr2 can be obtained by the equation (4).

In the Δt2 calculation step (S120), the Δt2 calculation unit 64 (offset calculation unit) calculates an offset amount depending on the image accumulation time of the photo sensor element. Specifically, the Δt2 calculation unit 64 calculates an offset amount Δt2 corresponding to the change amount of the dark noise level. In the case of FIG. 4, for example, the change amount ΔDr of the dark noise level at the target object 1 can be obtained by using the difference between the dark noise levels Dr1 and Dr2 in the target object 1. The offset amount Δt2 can be defined by the equation (6) by using, for example, a gradient k of the linear proportion of the correlation at the target object 1.

$$\Delta t2 = k \cdot \Delta Dr = k(Dr2 - Dr1) \tag{6}$$

In the determination step (S122), the determination unit 66 determines whether the value of Ata currently recorded is the same as Δt2. If the recorded Δta is the same value as Δt2, it proceeds to the storage step (S130). If the recorded Δta is not the same value as Δt2, it proceeds to the Δt2 setting step (S124). Since Δta=0 is recorded at the beginning, it proceeds, in the first determination step (S122), to the Δt2 setting step (S124).

In the Δt2 setting step (S124), the Δt setting unit 68 sets the calculated offset amount Δt2 in the offset circuit 126.

In the scanning step (S126), the optical image acquisition mechanism 150 scans the inspection stripe 20 with laser beams (inspection light) so as to acquire, for each inspection stripe 20, an image of the stripe region by the TDI sensor 105. Detailed operations are the same as those of the scanning step (S110). Therefore, a light having passed through the substrate 101 is focused, through the magnifying optical system 104 and the image forming optical system 176, to form an incident optical image on the photo sensor array 124. Alternatively, a light reflected from the substrate 101 is focused, through the magnifying optical system 104 and the image forming optical system 176, to form an incident optical image on the photo sensor array 124.

The TDI sensor 105 acquires an image of the inspection substrate 101 by receiving a transmitted light or reflected light from the inspection substrate 101 by a plurality of photo sensor elements. Then, the TDI sensor 105 corrects, using an offset amount, a pixel value of optical image data acquired, and outputs corrected optical image data. Specifically, it operates as follows: A pattern image focused/formed on the photo sensor array 124 is photoelectrically converted by each photo sensor element of the photo sensor array 124, and further, analog-to-digital (A/D) converted by the sensor circuit 125. At this process, the output after integration of the plurality of photo sensor elements arrayed in the scanning direction is converted to an inspection signal (pixel value) corresponding to the correlation described above by the sensor circuit 125. Then, the inspection signal (pixel value) is offset by the set offset amount at by the offset circuit 126. The offset amount Δt is set to be Δt2. Therefore, here, correction (offset) is performed by subtracting Δt2 from the inspection signal (pixel value) of each pixel. The inspection signal (pixel value) of each pixel having been offset is output to the stripe pattern memory 123. Data of the pixel value of the inspection stripe 20 to be measured is stored in the stripe pattern memory 123. Measurement data (pixel data) is, for example, 8-bit unsigned data, and indicates a gray scale level of brightness (light amount) of each pixel.

As described referring to FIG. 3, the dark noise level changes in the increase phase. Therefore, in the increase phase of FIG. 3, the offset amount calculation circuit 136 (offset calculation unit) calculates an offset amount according to an image acquisition timing. Then, the TDI sensor 105 corrects, for each image acquisition timing, optical image data by using the offset amount corresponding to the image acquisition timing concerned. It operates as follows:

In the storage (recording) step (S128), the storage (recording) processing unit 52 records (overwrites) $\Delta ta = \Delta t2$. Then, it returns to the $\delta$ measuring step (S114). Each step from the measuring step (S114) to the storage step (S128) is repeated until $\Delta ta$ currently recorded in the determination step (S122) reaches the same value as the latest $\Delta t2$ calculated in the $\Delta t2$ calculation step (S120). Each step from the $\delta$ measuring step (S114) to the storage step (S128) corresponds to changing of the dark noise level in the increase phase of FIG. 3. The offset amount is changed whenever a new $\Delta t2$ is set in the $\Delta t2$ setting step (S124). For example, the offset amount is changed for each inspection stripe 20. Alternatively, for example, the offset amount is changed during scanning the inspection stripe 20.

When the elapsed time $\delta$ reaches the time to enter the stable phase, that is the time L has passed, $\Delta ta$ currently recorded becomes the same value as the latest $\Delta t2$ calculated in the $\Delta t2$ calculation step (S120).

As described referring to FIG. 3, the dark noise level becomes fixed in the stable phase. Therefore, the TDI sensor 105 corrects optical image data by using a fixed offset amount when a predetermined period ($\delta = L$) has passed since changing the image accumulation time of the photo sensor element to t2 from t1. Specifically, optical image data is corrected by $\Delta t2(L)$ in the stable phase of FIG. 3. It operates as follows:

When, in the determination step (S122), the value of $\Delta ta$ currently recorded is determined to be the same as the latest $\Delta t2$ calculated in the $\Delta t2$ calculation step (S120), it proceeds to the storage step (S130).

In the storage step (S130), the storage processing unit 52 records ta=t2 and Ta=T2. Then, it returns to the setting step (S108). Each step from the setting step (S108) to the determination step (S112) is repeated until it is determined in the determination step (S112) that the image accumulation time t of the photo sensor element becomes different from ta which is currently recorded.

In the scanning step (S110) at ta=t2, an inspection signal (pixel value) is offset by a fixed offset amount $\Delta t2(L)$ set in the stable phase by the offset circuit 126.

Further, when changing the image accumulation time of the photo sensor element to t3 from t2, replacement reading is performed from t2, T2 Dr2, $\Delta t2$ to t3, T3, Dr3, $\Delta t3$ in each step after the measuring step (S114).

By the operations described above, image data of each inspection stripe 20 can be acquired in which the pixel value has been offset by the offset amount corresponding to a change of the dark noise level.

Figure 7:
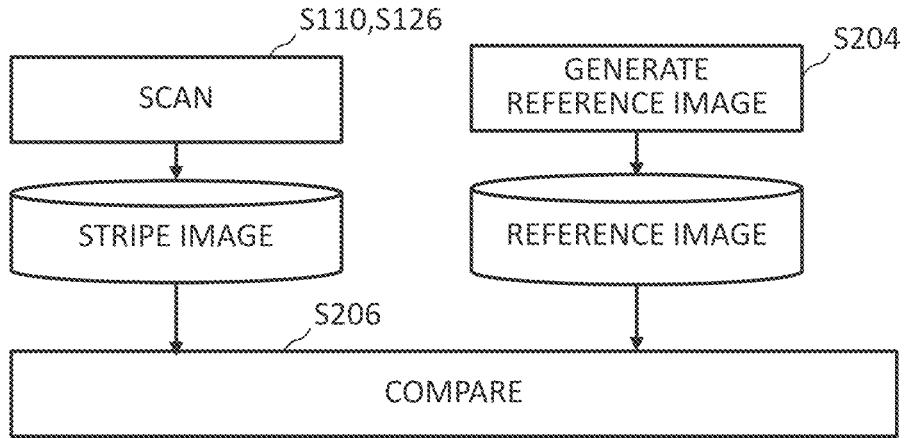
FIG. 7 is a flowchart showing an example of main steps
of an inspection method according to the first embodiment.

FIG. 7 is a flowchart showing an example of main steps of an inspection method according to the first embodiment. In FIG. 7, the inspection method of the first embodiment executes a series of steps: the scanning steps (S110) and (S126) described above, a reference image generating step (S204), and a comparing step (S206). The contents of the scanning steps (S110) and (S126) are what is described above.

In the reference image generating step (S204), the reference image generation circuit 112 generates a reference image serving as a reference, using figure pattern data (design data). Generating a reference image is carried out, for each inspection stripe 20, in parallel to the scanning operation of the inspection stripe 20 concerned. Specifically, it operates as follows: The reference image generation circuit 112 inputs figure pattern data (design data) with respect to each frame region 30 of the target inspection stripe 20, and converts each figure pattern defined by the input figure pattern data into image data of binary or multiple values.

Basic figures defined by the figure pattern data are, for example, rectangles and triangles. For example, figure data is stored which defines the shape, size, position, and the like of each pattern figure by using information, such as coordinates (x, y) of the reference position of the figure, lengths of sides of the figure, and a figure code serving as an identifier for identifying the figure type such as rectangles, triangles and the like.

When design pattern data used as the figure data is input to the reference image generation circuit 112, the data is developed into data of each figure. Then, the figure code, the figure dimensions, and the like indicating the figure shape of each figure data are interpreted. Then, the reference image generation circuit 112 develops each figure data to design pattern image data of binary or multiple values as a pattern to be arranged in squares in units of grids of predetermined quantization dimensions, and outputs the developed data. In other words, the reference image generation circuit 112 reads design data, calculates the occupancy of a figure in the design pattern, for each square region obtained by virtually dividing the frame region into squares in units of predetermined dimensions, and outputs n-bit occupancy data (design image data). For example, it is preferable to set one square as one pixel. Assuming that one pixel has a resolution of $1/2^8$ ($=1/256$), the occupancy rate in each pixel is calculated by allocating sub regions each being $1/256$ to the region of a figure arranged in the pixel. Then, it becomes 8-bit occupancy data. Such square regions (inspection pixels) can be corresponding to pixels of measured data.

Next, the reference image generation circuit 112 performs filtering processing, using a filter function, on design image data of a design pattern which is image data of a figure.

Figure 8:
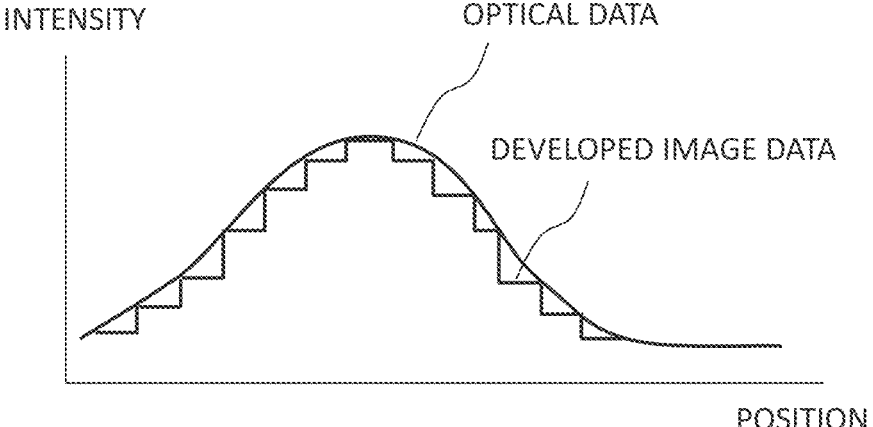
FIG. 8 is a graph illustrating filter processing according to
the first embodiment.

FIG. 8 is a graph illustrating filter processing according to the first embodiment. Pixel data of an optical image acquired from the substrate 101 is in a state affected by filtering due to resolution characteristics etc. of the optical system used for image-capturing, in other words, in an analog state continuously changing. Therefore, for example, as shown in FIG. 8, the optical image is different from the developed image (design image) whose image intensity (gray scale value) is represented by digital values. On the other hand, in figure pattern data, since pattern codes, etc. are used for defining as described above, image intensity (gray scale level) of developed design images may be digital values. Accordingly, the reference image generation circuit 112 performs image processing (filter processing) on the developed image in order to generate a reference image close to the optical image. Thereby, it is possible to match design image data being design side image data, whose image intensity (gray scale level) is in digital values, with image generation characteristics of measured data (optical image). The generated reference image is output to the comparison circuit 108.

Figure 9:
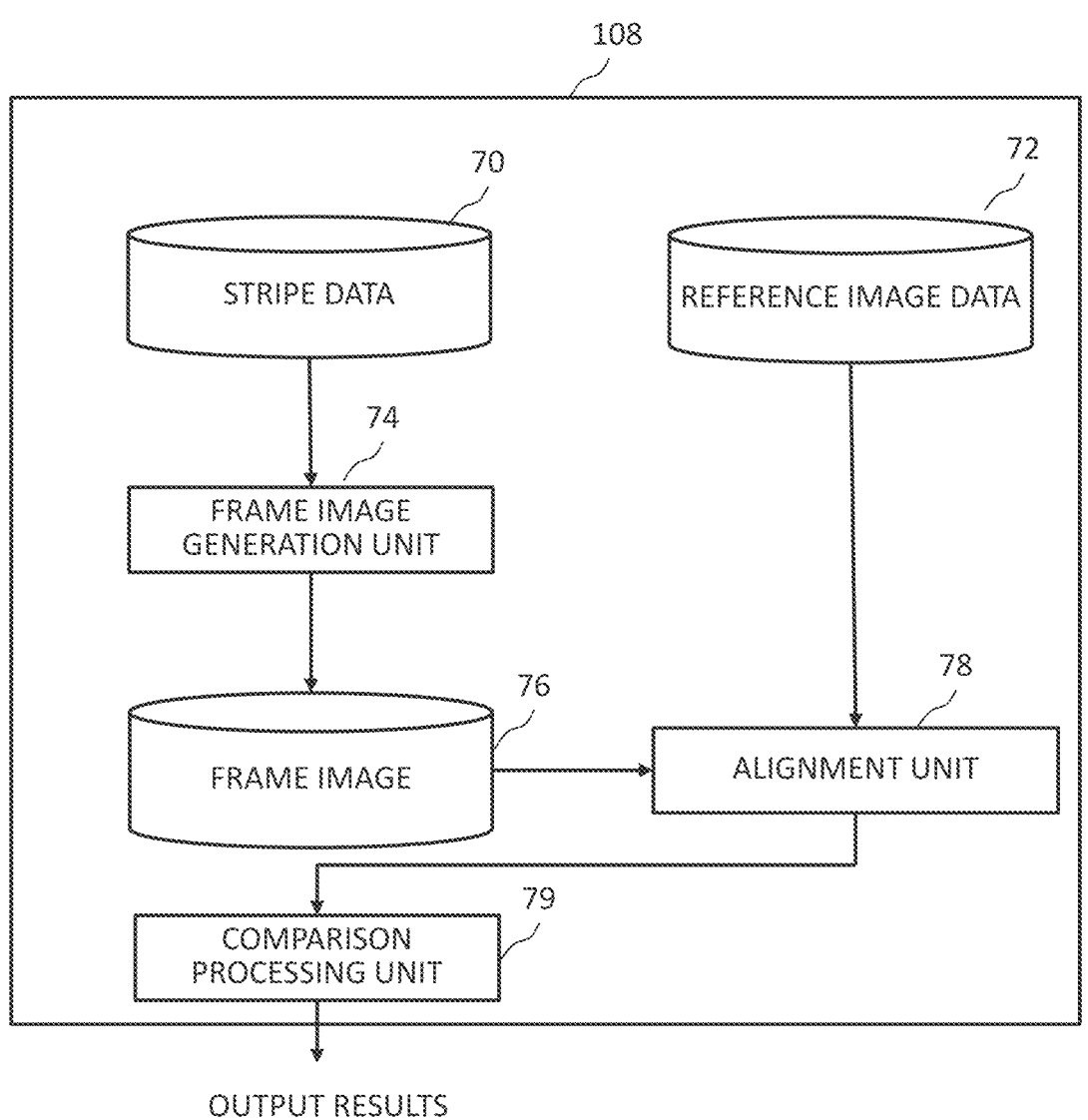
FIG. 9 is a block diagram showing an example of an
internal configuration of each comparison circuit according
to the first embodiment.

FIG. 9 is an example of an internal configuration of each comparison circuit according to the first embodiment. As shown in FIG. 9, in the comparison circuit 108, there are disposed storage devices 70, 72, and 76 such as magnetic disk drives, a frame image generation unit 74, an alignment unit 78, and a comparison processing unit 79. Each of the "units" such as the frame image generation unit 74, the alignment unit 78, and the comparison processing unit 79 includes processing circuitry. The processing circuitry includes, for example, an electric circuit, a computer, a processor, a circuit board, a quantum circuit, semiconductor device, or the like. Further, common processing circuitry (the same processing circuitry), or different processing circuitry (separate processing circuitry) may be used for each of the " . . . units". Input data required in the frame image generation unit 74, the alignment unit 78, and the comparison processing unit 79, and calculated (operated) results are stored in a memory (not shown) in the comparison circuit 108 or in the memory 111 each time.

Stripe data (stripe region image) input to the comparison circuit 108 is stored in the storage device 70. Reference image data input to the comparison circuit 108 is stored in the storage device 72.

In the comparing step (S206), the comparison circuit 108 (example of a comparison unit) compares an optical image formed by optical image data output from the TDI sensor 105 with a reference image. Specifically, it operates as follows:

In the comparison circuit 108, first, the frame image generation unit 74 generates a plurality of frame images 31 by dividing the stripe region image (optical image) by a predetermined width. Specifically, as shown in FIG. 2, the stripe region image is divided into frame images of a plurality of rectangular frame regions 30. For example, it is divided into the size of 512×512 pixels. Data of each frame region 30 is stored in the storage device 76.

Next, the alignment unit 78 reads, for each frame region 30, a corresponding frame image 31 and a corresponding reference image from the storage devices 72 and 76, and performs alignment (position adjustment) of the frame image 31 and the corresponding reference image based on a predetermined algorithm. For example, the alignment is performed according to the least-square method.

The comparison processing unit 79 (another example of the comparison unit) compares the frame image 31 with the reference image corresponding to the frame image 31 concerned. For example, comparing is performed for each pixel. Here, the comparison processing unit 79 compares, for each pixel, both the images based on predetermined determination conditions in order to determine whether there is a defect, such as a shape defect, or not. For example, based on predetermined algorithm as the determination conditions, both the images are compared each other for each pixel to determine whether there is a defect or not. For example, for each pixel, a difference value between pixel values of the optical image and the reference image is calculated, and it is determined there is a defect when the difference value is larger than a threshold Th. Then, the comparison result is output to, for example, the magnetic disk drive 109, the magnetic tape drive 115, the flexible disk drive (FD) 116, the CRT 117, or the pattern monitor 118, or alternatively, output from the printer 119.

Although the case of performing the die-to-database inspection is described in the above example, the die-to-die inspection may also be used. In that case, with respect to frame regions of dies 1 and 2 for the die-to-die inspection in a plurality of frame regions 30, the comparison circuit 108 uses a frame image (optical image) of the die 2, as a reference (reference image). First, for each frame region 30 to which the die-to-die inspection is performed, the alignment unit 78 reads the frame image 31 of the die 1 and a corresponding frame image of the die 2 from the storage device 76, and performs alignment between the frame image 31 of the die 1 and the frame image of the die 2 based on a predetermined algorithm. For example, the alignment is performed according to the least-square method. Then, for each frame region 30 to which the die-to-die inspection is performed, the comparison processing unit 79 (comparison unit) compares, for each pixel, the frame image 31 of the die 1 with the corresponding frame image of the die 2.

As described above, according to the first embodiment, it is possible to inhibit/prevent degradation of the image accuracy, which is caused by change of the image accumulation time of the photo sensor element, by performing offset according to change of the dark noise level resulting from the change of the image accumulation time of the photo sensor element.

Second Embodiment

In the above first embodiment, correction is performed correspondingly to the change of the dark noise level resulting from the change of the image accumulation time of the photo sensor element. However, the method for inhibiting/preventing degradation of images is not limited thereto. According to a second embodiment, the dark noise level change itself in the case of changing the image accumulation time of the photo sensor element can be inhibited/prevented. Hereinafter, the contents of the second embodiment are the same as those of the first embodiment except for what is particularly described below.

Figure 10:
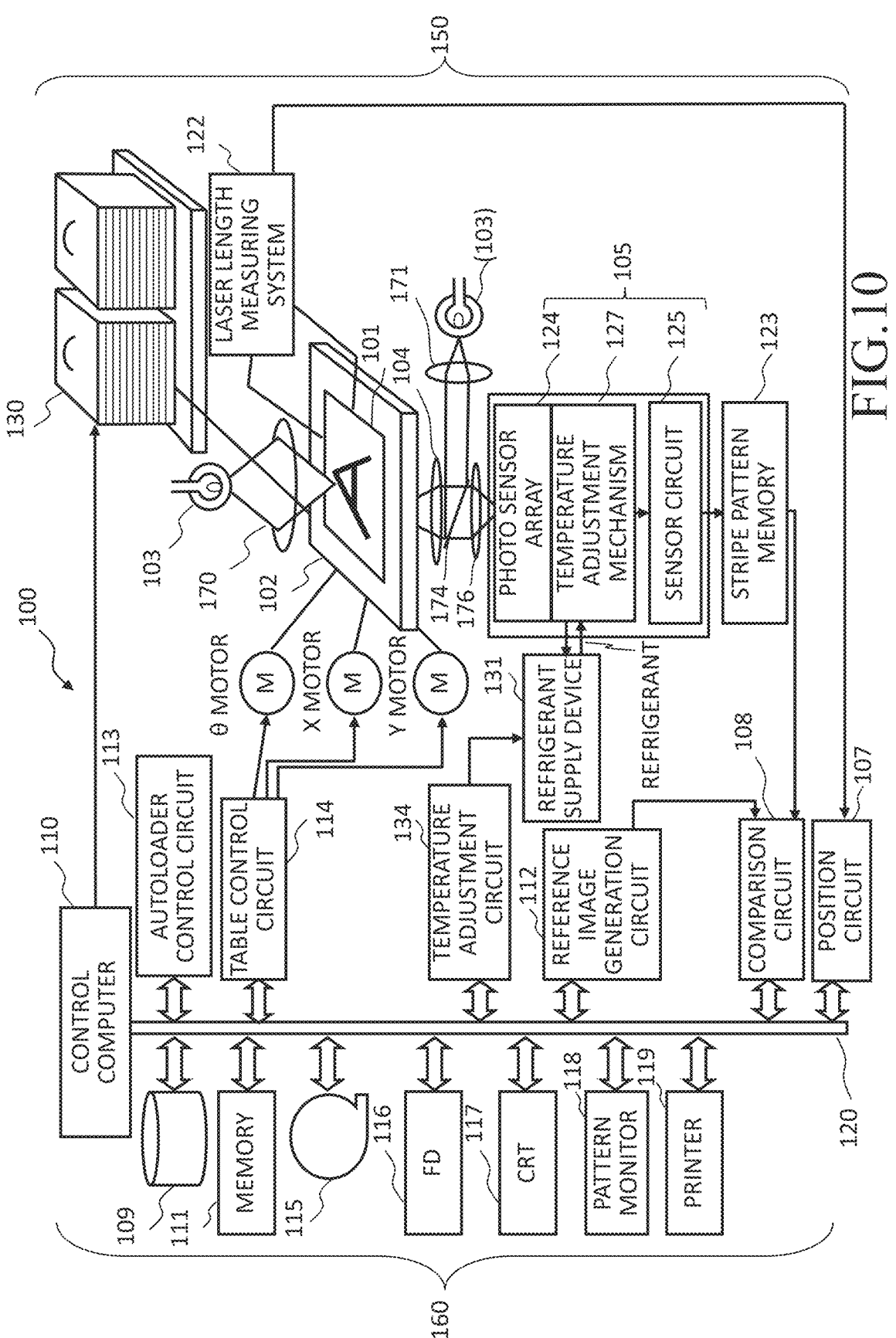
FIG. 10 is a configuration diagram showing a pattern
inspection apparatus according to a second embodiment.

FIG. 10 is a configuration diagram showing a pattern inspection apparatus according to the second embodiment. FIG. 10 is the same as FIG. 1 except that the TDI sensor 105 has a different configuration, and a temperature adjustment circuit 134 and a refrigerant supply device 131 are disposed in place of the offset amount calculation circuit 136.

Figure 11:
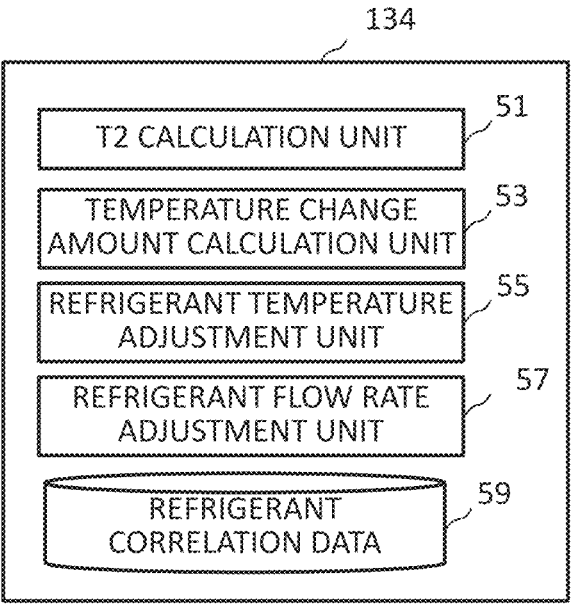
FIG. 11 is a block diagram showing an example of an
internal configuration of a temperature adjustment circuit
according to the second embodiment.

FIG. 11 is a block diagram showing an example of an internal configuration of a temperature adjustment circuit according to the second embodiment. As shown in FIG. 11, in the temperature adjustment circuit 134, there are arranged the storage device 59 such as a magnetic disk drive, a T2 calculation unit 51, a temperature change amount ΔT calculation unit 53, a refrigerant temperature adjustment unit 55, and a refrigerant flow rate adjustment unit 57. Each " . . . unit", such as the T2 calculation unit 51, the temperature change amount ΔT calculation unit 53, the refrigerant temperature adjustment unit 55, and the refrigerant flow rate adjustment unit 57 includes processing circuitry. The processing circuitry includes, for example, an electric circuit, a computer, a processor, a circuit board, a quantum circuit, a semiconductor device, or the like. Further, common processing circuitry (the same processing circuitry), or different processing circuitry (separate processing circuitry) may be used for each " . . . unit". Input data necessary for the T2 calculation unit 51, the temperature change amount ΔT calculation unit 53, the refrigerant temperature adjustment unit 55, and the refrigerant flow rate adjustment unit 57, and operated (calculated) results are stored in a memory (not shown) in the temperature adjustment circuit 134, or in the memory 111 each time.

The TDI sensor 105 includes the photo sensor array 124, a temperature adjustment mechanism 127, and the sensor circuit 125. According to the second embodiment, dark noise level change is inhibited by maintaining the sensor temperature of the photo sensor array 124 to be constant by the temperature adjustment mechanism 127.

Figure 12A:
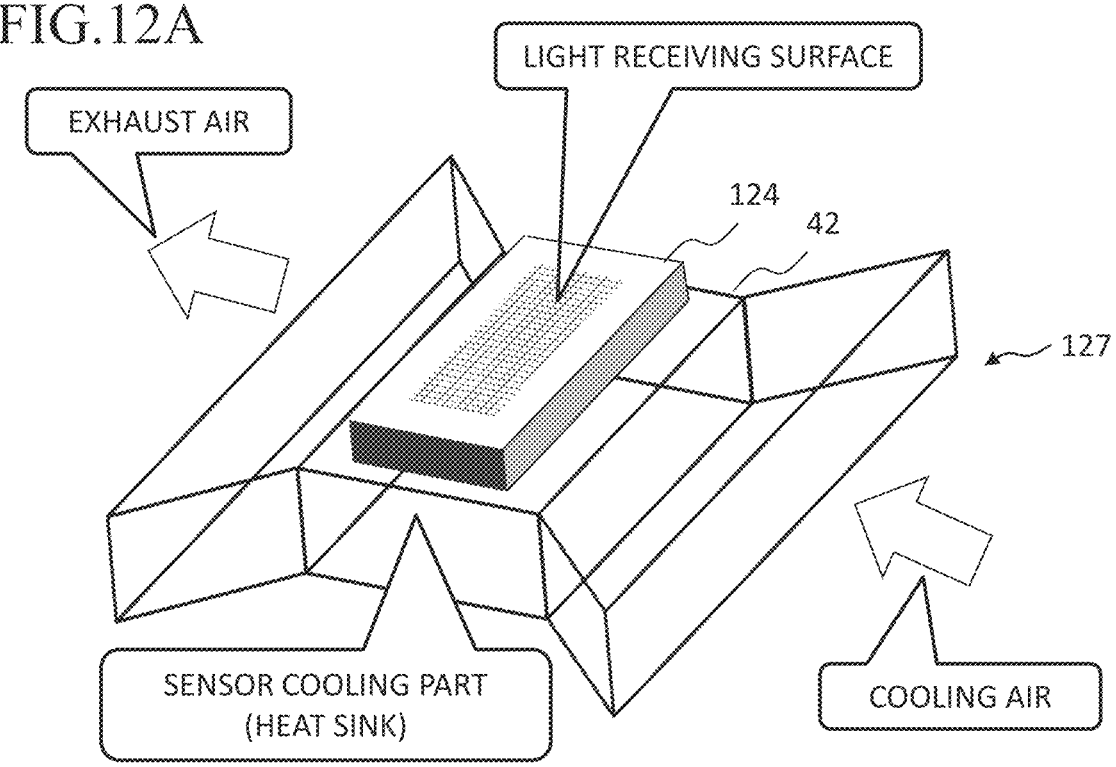
FIGS. 12A and 12B are configuration diagrams showing
an example of a temperature adjustment mechanism accord-
ing to the second embodiment.
Figure 12B:
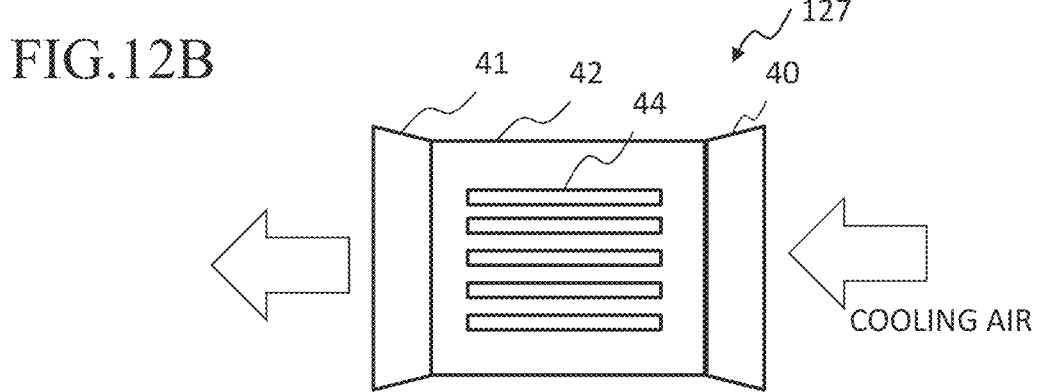

FIGS. 12A and 12B are configuration diagrams showing an example of a temperature adjustment mechanism according to the second embodiment. In FIG. 12B, the temperature adjustment mechanism 127 includes an air cooling mechanism, for example. Specifically, the temperature adjustment mechanism 127 includes an air inlet 40, an air outlet 41, and a heat sink 42. As shown in FIG. 12B, a plurality of fins 44 are arranged in the heat sink 42. The photo sensor array 124 includes a light receiving surface which converts an inspection image into an electric signal. The photo sensor array 124 is disposed to contact the heat sink 42 having good heat conductivity. Specifically, as shown in FIG. 12A, the bottom of the photo sensor array 124 is placed on the heat sink 42. Cooling air which serves as an example of the refrigerant is supplied from the refrigerant supply device 131 to the temperature adjustment mechanism 127. The cooling air serving as an example of the refrigerant absorbed from the air inlet 40 is exhausted from the air outlet 41 through the heat sink 42. The cooling air in the heat sink 42 cools the photo sensor array 124 through a plurality of fins 44, and then, a warmed refrigerant is exhausted from the air outlet 41. By arranging the plurality of fins 44, a large surface area can contact the cooling air. Therefore, the heat exchange efficiency can be increased by arranging the plurality of fins 44.

The T2 calculation unit 51 calculates a sensor temperature T2 at the stable phase in the case of the elapsed time δ having passed a predetermined period L since changing the image accumulation time of the photo sensor element to t2 from t1. As the sensor temperature at the time of the changing, T1 may be used.

The temperature change amount calculation unit 53 calculates a temperature change amount ΔT which depends on the image accumulation time of each of a plurality of photo sensor elements arrayed two-dimensionally. Specifically, the temperature change amount calculation unit 53 calculates a temperature change amount ΔT(=T2−T1) in the case of the elapsed time δ having passed for a predetermined period L since changing the image accumulation time of the photo sensor element to t2 from t1.

The refrigerant temperature adjustment unit 55 adjusts the temperature of the refrigerant, using the temperature change amount ΔT. In the case of FIGS. 12A and 12B, the temperature of the cooling air is adjusted. Specifically, the refrigerant temperature adjustment unit 55 outputs a target value of the temperature of the refrigerant to the refrigerant supply device 131 so that the temperature change amount ΔT generated when the elapsed time δ has passed the predetermined period L may be zero.

The refrigerant flow rate adjustment unit 57 adjusts the flow rate of the refrigerant, using the temperature change amount ΔT. In the case of FIGS. 12A and 12B, the flow rate of the cooling air is adjusted. Specifically, the refrigerant flow rate adjustment unit 57 outputs a set value of the flow rate of the refrigerant to the refrigerant supply device 131 so that the temperature change amount ΔT generated when the elapsed time δ has passed the predetermined period L may be zero. The relation among the temperature change amount ΔT generated when the elapsed time δ has passed the predetermined period L, the target value of the temperature, and the set value of the flow rate may be measured in advance by experiment or simulation. Specifically, in order to obtain a heat amount Q which generates the temperature change amount ΔT after the predetermined period L has passed, heat generation with the heat amount q(=Q/L) per unit time is needed. Then, the relation is obtained between the set value of the flow rate and the target value of the temperature which is heat-exchangeable with the heat amount q per unit time. The previously measured correlation among the temperature change amount ΔT, the target value of the temperature, and the set value of the flow rate is stored in the storage device 59 in advance as refrigerant correlation data.

In the air cooling mechanism, the relation among the temperature change amount ΔT generated when the predetermined period L has passed, the target value of the temperature, and the set value of the flow rate may be measured beforehand using the cooling air by experiment or simulation.

In the refrigerant supply device 131, the temperature of the refrigerant is adjusted to be close to a target value by a function of temperature adjustment. Then, the refrigerant supply device 131 supplies the temperature-adjusted refrigerant to the temperature adjustment mechanism 127 at a set flow rate. The refrigerant exhausted from the temperature adjustment mechanism 127 is collected by the refrigerant supply device 131 to be reused.

By the processing described above, the temperature change of the photo sensor array 124 in the case of changing the image accumulation time of the photo sensor element can be inhibited. Thus, by inhibiting the change of the temperature, change of the dark noise level can be inhibited. In other words, the temperature of the photo sensor array is maintained to be constant, and the dark noise level can be prevented from changing.

Therefore, in the scanning step, the TDI sensor 105 receives a transmitted light or reflected light from the inspection substrate 101 by a plurality of photo sensor elements while controlling the temperature of the plurality of photo sensor elements by using the temperature change amount ΔT. By this, an image of the inspection substrate 101 is acquired. Since the change of the dark noise level can be inhibited, generation of a gray scale error is avoidable.

Figure 13A:
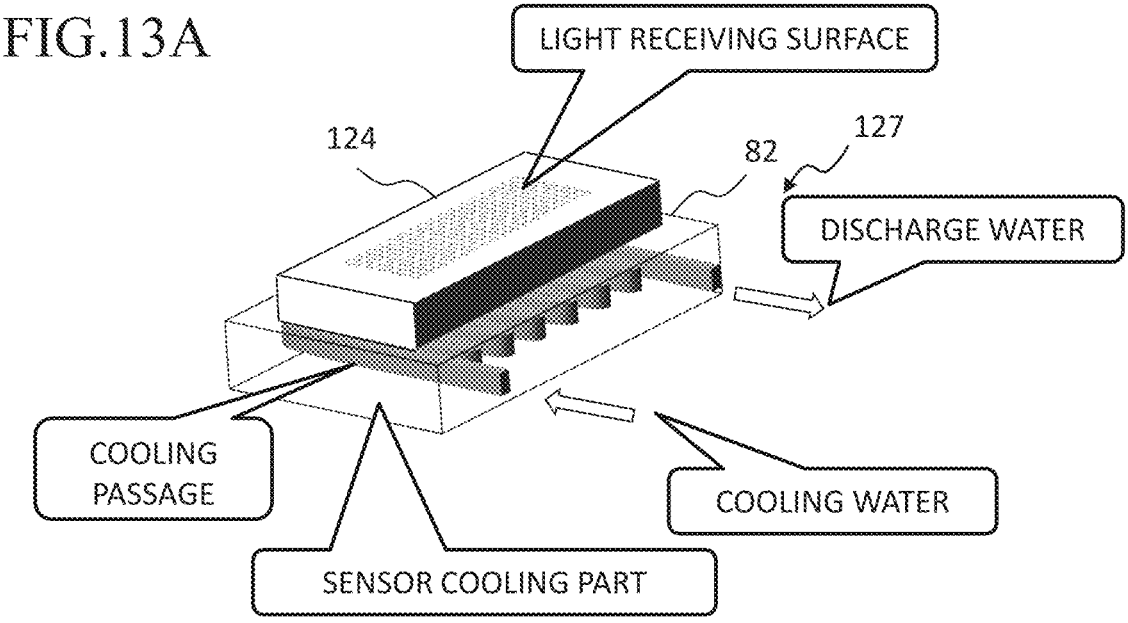
FIGS. 13A and 13B are configuration diagrams showing
another example of a temperature adjustment mechanism
according to the second embodiment.
Figure 13B:
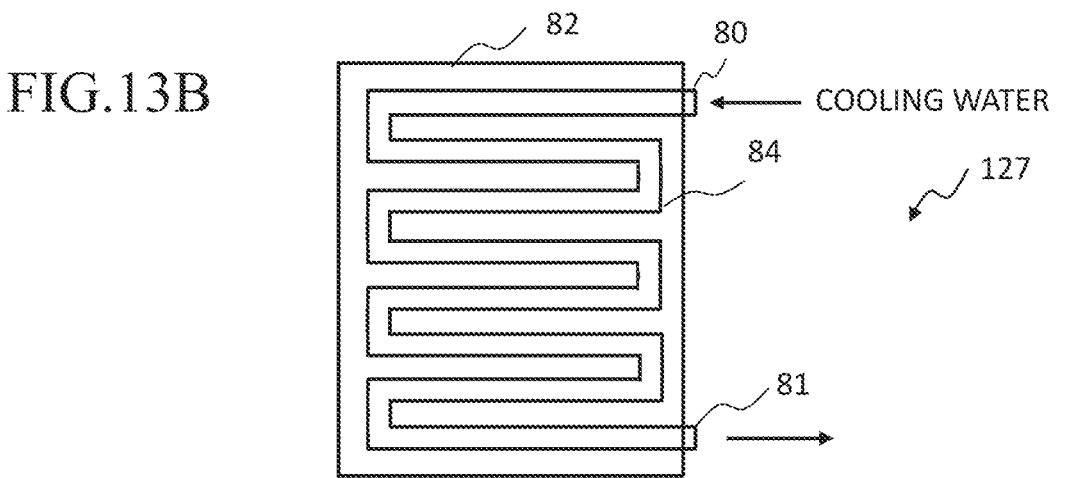

FIGS. 13A and 13B are configuration diagrams showing another example of a temperature adjustment mechanism according to the second embodiment. In FIG. 13B, the temperature adjustment mechanism 127 includes a water cooling mechanism, for example. Specifically, the temperature adjustment mechanism 127 includes a water inlet 80, a water outlet 81, and a heat sink 82. As shown in FIG. 13B, a cooling piping 84 is arranged in the heat sink 82. As shown in FIG. 13A, the photo sensor array 124 is disposed to contact the heat sink 82 having good heat conductivity. The bottom of the photo sensor array 124 is placed on the heat sink 82. Cooling water which serves as an example of the refrigerant is supplied from the refrigerant supply device 131 to the temperature adjustment mechanism 127. The cooling water serving as an example of the refrigerant absorbed from the water inlet 80 is discharged from the water outlet 81 through the heat sink 82. The cooling water in the heat sink 82 cools the photo sensor array 124 through the cooling piping 84, and then, a warmed refrigerant is discharged from the water outlet 81. The cooling piping 84 is arranged to meander in the heat sink 82. By meandering, heat conduction can be performed at a large surface area. Therefore, the heat exchange efficiency is increased.

In the water cooling mechanism, the relation among the temperature change amount ΔT generated when the predetermined period L has passed, the target value of the temperature, and the set value of the flow rate may be measured beforehand using the cooling water by experiment or simulation.

In the refrigerant supply device 131, the temperature of the cooling water is adjusted to be close to a target value by a function of temperature adjustment. Then, the refrigerant supply device 131 supplies the temperature-adjusted cooling water to the temperature adjustment mechanism 127 at a set flow rate. The cooling water discharged from the temperature adjustment mechanism 127 is collected by the refrigerant supply device 131 to be reused.

Figure 14:
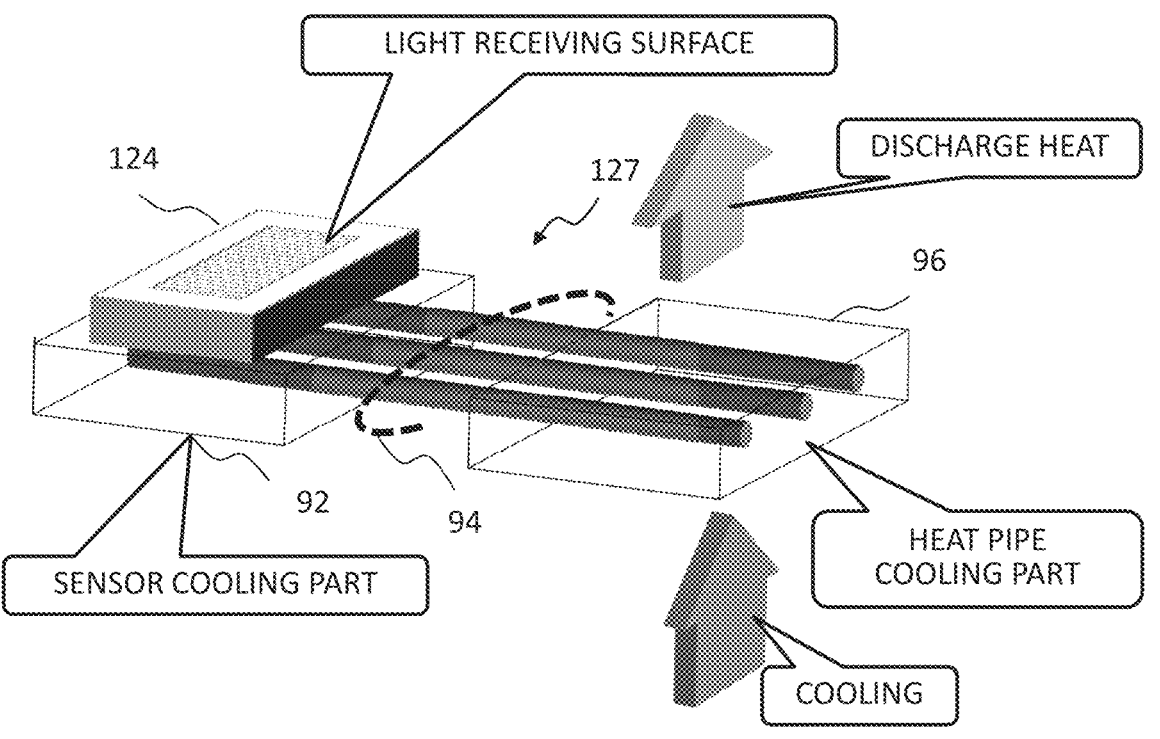
FIG. 14 is a configuration diagram showing another
example of a temperature adjustment mechanism according
to the second embodiment.

FIG. 14 is a configuration diagram showing another example of a temperature adjustment mechanism according to the second embodiment. In FIG. 14, the temperature adjustment mechanism 127 includes a heat pipe mechanism, for example. Specifically, the temperature adjustment mechanism 127 includes a heat sink 92, at least one heat pipe 94, and a heat sink 96. One end side of the at least one heat pipe 94 is arranged in the heat sink 92. The other end side of the at least one heat pipe 94 is arranged in the heat sink 96. The photo sensor array 124 is disposed to contact the heat sink 92 having good heat conductivity. The bottom of the photo sensor array 124 is placed on the heat sink 92. Refrigerant is supplied from the refrigerant supply device 131 to the temperature adjustment mechanism 127. In the heat sink 92, heat exchange is performed between the photo sensor array 124 and the one end side of the heat pipe 94. In the heat sink 96, heat exchange is performed between the other end side of the heat pipe 94 and the refrigerant. The refrigerant may be cooling air or cooling water.

In the heat pipe mechanism, the relation among the temperature change amount ΔT generated when the predetermined period L has passed, the target value of the temperature, and the set value of the flow rate may be measured beforehand by experiment or simulation, using the refrigerant to be employed.

As described above, in the scanning step (S110), since the change of the dark noise level can be inhibited, generation of a gray scale error is avoidable. The contents of each step after the reference image generating step (S204) are the same as those of the first embodiment.

As described above, according to the second embodiment, it is possible to inhibit/prevent degradation of the image accuracy, which is caused by change of the image accumulation time of the photo sensor element, by inhibiting/preventing change of the dark noise level resulting from the change of the image accumulation time of the photo sensor element.

Third Embodiment

The above second embodiment describes the case of inhibiting/preventing change of the dark noise level by inhibiting/preventing the temperature change itself. A third embodiment describes a configuration for taking measures against generation of errors in inhibiting/preventing the temperature change. Hereinafter, the contents of the third embodiment are the same as those of the first and second embodiments except for what is particularly described below.

Figure 15:
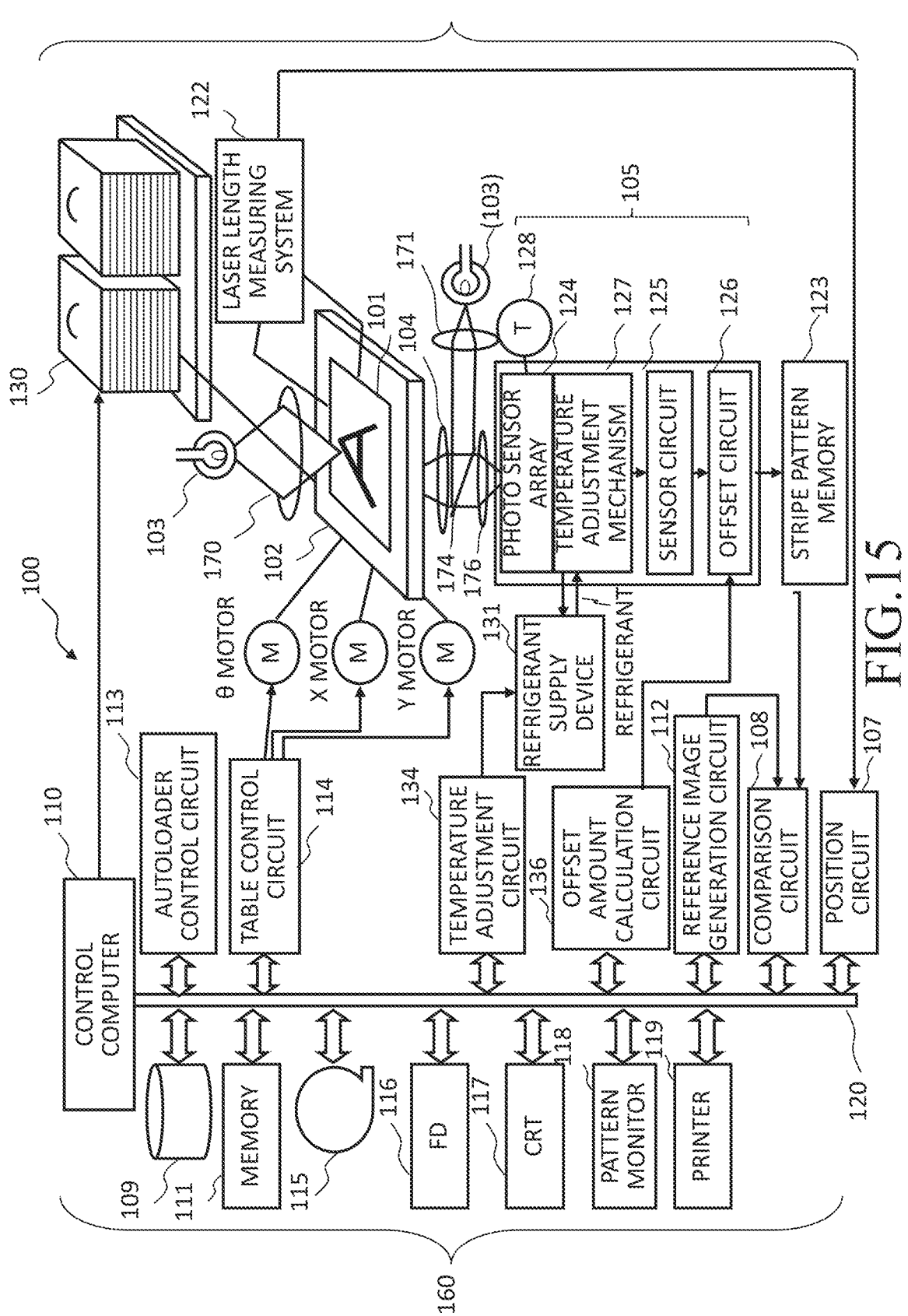
FIG. 15 is a configuration diagram showing a pattern
inspection apparatus according to a third embodiment.

FIG. 15 is a configuration diagram showing a pattern inspection apparatus according to the third embodiment. FIG. 10 is the same as FIG. 1 except that the TDI sensor 105 has a different configuration, and the temperature adjustment circuit 134 and the refrigerant supply device 131 are further disposed. The third embodiment provides the inspection apparatus 100 configured by combining the first embodiment and the second embodiment.

Similarly to the second embodiment, the temperature change of the photo sensor array 124 in the case of changing the image accumulation time of the photo sensor element is inhibited by the temperature adjustment mechanism 127. At this point, a dark noise level change occurs due to an error after the temperature controlling by the temperature adjustment mechanism 127.

The TDI sensor 105 includes the photo sensor array 124, the temperature adjustment mechanism 127, the sensor circuit 125, the offset circuit 126, and a temperature sensor 128. In the third embodiment, similarly to the second embodiment, change of the dark noise level is inhibited by maintaining the sensor temperature of the photo sensor array 124 to be constant by the temperature adjustment mechanism 127.

In the offset amount calculation circuit 136, the Dr2 calculation unit 62 calculates a dark noise level Dr2 in the state of the sensor temperature T2 which was changed by changing the image accumulation time of the photo sensor element to t2. The dark noise level Dr2 can be obtained by the equation (4). As the sensor temperature T2 here, a measured value by the temperature sensor 128 is used. Thereby, the dark noise level Dr2 based on an error temperature after controlling the temperature by the temperature adjustment mechanism 127 can be obtained.

In the example described above, a measured value by the temperature sensor 128 is used as an error temperature after the temperature controlling. However, it is also preferable to obtain the error temperature by calculation. For example, the ambient temperature around the photo sensor array 124, thermostat capacity (exhaust heat amount per unit time), consumed power of the photo sensor array 124 (for each accumulation time), heat transfer rate (coefficient) of the photo sensor array 124, surface area of the photo sensor array 124, and heat capacity of the photo sensor array 124 are used. If the embodiment of the TDI sensor 105 is specified, these values can be obtained in advance. Then, if the initial state (accumulation time t1, sensor temperature T1) is specified, the temperature of the photo sensor array 124 after changing the image accumulation time from t1 to t2, t3, . . . can be calculated based on the parameters described above.

The Δt2 calculation unit 64 (offset calculation unit) calculates an offset amount corresponding to a temperature error in the case of controlling the temperature of a plurality of photo sensor elements. Specifically, the Δt2 calculation unit 64 calculates an offset amount Δt2 corresponding to the change amount of the dark noise level. In the case of FIG. 4, for example, the change amount ΔDr of the dark noise level at the target object 1 can be obtained by using the difference between the dark noise levels Dr1 and Dr2 in the target object 1. The offset amount Δt2 can be defined by the equation (6) by using, for example, a gradient k of the linear proportion of the correlation at the target object 1.

$$\Delta t2 = k \cdot \Delta Dr = k(Dr2 - Dr1) \tag{6}$$

The TDI sensor 105 corrects optical image data by using the offset amount corresponding to the error temperature. Specifically, it operates as follows:

In the scanning step (S110) (S126), the TDI sensor 105 acquires an image of the inspection substrate 101 by receiving a transmitted light or reflected light from the inspection substrate 101 by a plurality of photo sensor elements. Then, the TDI sensor 105 corrects, using an offset amount, a pixel value of optical image data acquired, and outputs corrected optical image data. Specifically, it operates as follows: A pattern image focused/formed on the photo sensor array 124 is photoelectrically converted by each photo sensor element of the photo sensor array 124, and further, AD converted by the sensor circuit 125. At this process, the output after integration of the plurality of photo sensor elements arrayed in the scanning direction is converted to an inspection signal (pixel value) corresponding to the correlation described above by the sensor circuit 125. Then, the inspection signal (pixel value) is offset by the set offset amount at by the offset circuit 126. The offset amount Δt is set to be Δt2. Therefore, here, correction (offset) is performed by subtracting Δt2 from the inspection signal (pixel value) of each pixel. The inspection signal (pixel value) of each pixel having been offset is output to the stripe pattern memory 123. Data of the pixel value of the inspection stripe 20 to be measured is stored in the stripe pattern memory 123. Measurement data (pixel data) is, for example, 8-bit unsigned data, and indicates a gray scale level of brightness (light amount) of each pixel.

Since the change of the dark noise level can be inhibited and the change amount of the dark noise level resulting from a temperature controlling error can be offset, generation of a gray scale error is avoidable. The contents of each step after the reference image generating step (S204) are the same as those of the first embodiment.

As described above, according to the third embodiment, even when a control error by the temperature adjustment mechanism 127 occurs, correction can be performed by offsetting. Therefore, degradation of the image accuracy caused by the change of the image accumulation time of the photo sensor element can be inhibited/prevented.

In each embodiment described above, each " . . . circuit", such as the position circuit 107, the comparison circuit 108, the reference image generation circuit 112, the autoloader control circuit 113, the table control circuit 114, the temperature adjustment circuit 134, and the offset amount calculation circuit 136 includes processing circuitry. The processing circuitry includes, for example, an electric circuit, a computer, a processor, a circuit board, a quantum circuit, a semiconductor device, or the like. Further, each " . . . circuit" may use common processing circuitry (the same processing circuitry). For example, each processing may be implemented by the control computer 110. Alternatively, each " . . . circuit" may use different processing circuitry (separate processing circuitry). Input data necessary for each circuit, and operated (calculated) results are stored in a memory (not shown) in the circuit concerned, or in the memory 111 each time. A program for causing a computer or a processor to execute processing or the like may be stored in the storage device 109.

Embodiments have been explained referring to specific examples described above. However, the present invention is not limited to these specific examples. For example, although the above embodiments describe the case where the common TDI sensor 105 acquires images when a transmission illumination optical system and a reflection illumination optical system are combined, it is not limited thereto. It is also preferable to arrange different TDI sensors for image acquisition in a transmission inspection and a reflection inspection.

Further, although the TDI sensor is used for acquiring images in the above Embodiments, it is not limited thereto. What is necessary is to use a camera employing a photo sensor. Since a change of the dark noise level along with a change of the image accumulation time occurs similarly in a camera employing a photo sensor, correction can be similarly performed to each Embodiment described above.

While the apparatus configuration, control method, and the like not directly necessary for explaining the present invention are not described, some or all of them can be appropriately selected and used on a case-by-case basis when needed. For example, although description of the configuration of the control unit for controlling the inspection apparatus 100 is omitted, it should be understood that some or all of the configuration of the control unit can be selected and used appropriately when necessary.

Further, any pattern inspection apparatus and pattern inspection method that include elements of the present invention and that can be appropriately modified by those skilled in the art are included within the scope of the present invention.

Additional advantages and modification will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspection apparatus comprising:
an illumination optical system configured to illuminate an inspection substrate on which a pattern is formed;
an offset calculation circuit configured to calculate an offset amount based on a difference between a dark noise level Dr1 at an image accumulation time t1 of each of a plurality of photo sensor elements arrayed two-dimensionally and a dark noise level Dr2 in a case that the image accumulation time t1 is switched to an image accumulation time t2 different from the image accumulation time t1;
a time delay integration (TDI) sensor configured to include the plurality of photo sensor elements, to acquire an image of the inspection substrate by receiving one of a transmitted light and a reflected light from the inspection substrate by the plurality of photo sensor elements, to correct, using the offset amount, a pixel value of optical image data of the acquired image, and to output the optical image data having been corrected; and
a comparison circuit configured to compare an optical image formed by the optical image data output from the TDI sensor with a reference image, wherein
the offset calculation circuit calculates the offset amount according to an image acquisition timing from the time when the image accumulation time is switched until the dark noise level Dr2 is stabilized, and
the TDI sensor corrects, for each image acquisition timing, the optical image data by using the offset amount corresponding to the image acquisition timing concerned.

2. The apparatus according to claim 1, wherein the offset amount is a change amount of an inspection signal corresponding to a change amount of a dark noise level.

3. A pattern inspection method comprising:
illuminating an inspection substrate on which a pattern is formed;
calculating an offset amount based on a difference between a dark noise level Dr1 at an image accumulation time t1 of each of a plurality of photo sensor elements arrayed two-dimensionally and a dark noise level Dr2 in a case that the image accumulation time t1 is switched to an image accumulation time t2 different from the image accumulation time t1;
acquiring, using a time delay integration (TDI) sensor which includes the plurality of photo sensor elements, an image of the inspection substrate by receiving one of a transmitted light and a reflected light from the inspection substrate by the plurality of photo sensor elements, correcting, using the offset amount, a pixel value of optical image data of the acquired image, and outputting the optical image data having been corrected; and 5 comparing an optical image formed by the optical image data output from the TDI sensor with a reference image, wherein the offset amount is calculated according to an image acquisition timing from the time when the image accumulation time is switched until the dark noise level Dr2 is stabilized, and 10 the TDI sensor corrects, for each image acquisition timing, the optical image data by using the offset amount corresponding to the image acquisition timing concerned. 15

\* \* \* \* \*